US012505779B2

(12) United States Patent
Wu et al.

(10) Patent No.: US 12,505,779 B2
(45) Date of Patent: Dec. 23, 2025

(54) DISPLAY METHOD APPLIED TO DISPLAY DEVICE, DISPLAY DEVICE, AND ELECTRONIC APPARATUS

(71) Applicant: Beijing BOE Technology Development Co., Ltd., Beijing (CN)

(72) Inventors: Yanhong Wu, Beijing (CN); Hao Fang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/711,982

(22) PCT Filed: Apr. 28, 2023

(86) PCT No.: PCT/CN2023/091528

§ 371 (c)(1),
(2) Date: May 21, 2024

(87) PCT Pub. No.: WO2024/221394

PCT Pub. Date: Oct. 31, 2024

(65) Prior Publication Data

US 2025/0157381 A1 May 15, 2025

(51) Int. Cl.
*G09G 3/20* (2006.01)
*G09G 3/32* (2016.01)
*G09G 3/3208* (2016.01)

(52) U.S. Cl.
CPC ............. *G09G 3/2007* (2013.01); *G09G 3/32* (2013.01); *G09G 3/3208* (2013.01);
(Continued)

(58) Field of Classification Search
CPC ...... G09G 3/2007; G09G 3/32; G09G 3/3208; G09G 2320/0666; G09G 2340/06; G09G 2360/144
See application file for complete search history.

(56) References Cited

U.S. PATENT DOCUMENTS

2005/0127846 A1* 6/2005 Kim ........................ G09G 3/293 315/169.4
2010/0225238 A1* 9/2010 Medin .................. H04N 9/3111 315/210

(Continued)

FOREIGN PATENT DOCUMENTS

CN 108877734 A 11/2018
CN 111667798 A 9/2020

(Continued)

OTHER PUBLICATIONS

Qy Zhai et al. "The impact of illuminance and colour temperature on viewing fine art paintings under LED lighting", Lighting Research and Technology, 2014, 15 pages.

(Continued)

*Primary Examiner* — Amr A Awad
(74) *Attorney, Agent, or Firm* — Westman, Champlin & Koehler, P.A.

(57) ABSTRACT

A display method applied to a display device is provided. The display device may display according to image data of an image to be displayed, and the image data includes grayscales corresponding to a plurality of primary color components in a color gamut of a display screen of the display device. The method includes: determining a target color temperature; determining gains of the plurality of primary color components of the display device according to a functional relationship between the gains of the plurality of primary color components of the display device and a color temperature; acquiring initial image data of the image to be displayed; determining adjusted image data of the image to be displayed based on the determined gains and the acquired initial image data; and displaying the image to be displayed based on the adjusted image data of the image to be displayed.

14 Claims, 14 Drawing Sheets

(52) U.S. Cl.
CPC . *G09G 2320/0666* (2013.01); *G09G 2340/06* (2013.01); *G09G 2360/144* (2013.01)

(56) References Cited

U.S. PATENT DOCUMENTS

| | | | | |
|---|---|---|---|---|
| 2011/0032275 | A1* | 2/2011 | Marcu .................. | G09G 3/2003 345/690 |
| 2013/0335457 | A1* | 12/2013 | Yano .................... | G09G 3/3208 345/77 |
| 2019/0385542 | A1 | 12/2019 | Yang | |
| 2020/0036934 | A1 | 1/2020 | Yang et al. | |
| 2021/0375180 | A1 | 12/2021 | Zhai | |
| 2022/0385872 | A1 | 12/2022 | Wu | |

FOREIGN PATENT DOCUMENTS

| | | | |
|---|---|---|---|
| CN | 212303011 | U | 1/2021 |
| CN | 112905141 | A | 6/2021 |
| CN | 113194303 | A | 7/2021 |
| CN | 113852799 | A | 12/2021 |
| CN | 114584752 | A | 6/2022 |
| CN | 115019746 | A | 9/2022 |

OTHER PUBLICATIONS

A. A. Kruithof, "Tubular Luminescence Lamps for General Illumination", Philips Technical Review, vol. 6, No. 3, Mar. 1941, 32 pages.

* cited by examiner

| | BT.709 | | DCI-P3 | | BT.2020 | |
|---|---|---|---|---|---|---|
| | x | y | x | y | x | Y |
| R | 0.640 | 0.330 | 0.680 | 0.320 | 0.708 | 0.292 |
| G | 0.300 | 0.600 | 0.265 | 0.690 | 0.170 | 0.797 |
| B | 0.150 | 0.060 | 0.150 | 0.060 | 0.131 | 0.046 |
| W | 0.3127 | 0.3290 | 0.314 | 0.351 | 0.3127 | 0.3290 |

a b

DISPLAY METHOD APPLIED TO DISPLAY DEVICE, DISPLAY DEVICE, AND ELECTRONIC APPARATUS

CROSS-REFERENCE TO RELATED APPLICATION(S)

This application is a Section 371 National Stage Application of International Application No. PCT/CN2023/091528, filed on Apr. 28, 2023, entitled "DISPLAY METHOD APPLIED TO DISPLAY DEVICE, DISPLAY DEVICE, AND ELECTRONIC APPARATUS", the content of which is incorporated herein by reference in its entirety.

TECHNICAL FIELD

The present disclosure relates to the field of display technology, in particular to a display method applied to a display device, a display device, and an electronic apparatus.

BACKGROUND

With the popularization of electronic apparatuses such as mobile phones, tablet computers and televisions, people spend more time using electronic apparatuses in daily office and leisure time, and may watch screens of electronic apparatuses for a long time, which may cause eye fatigue and even irreversible eye diseases.

In a related art, some manufacturers have provided eye protection mode functions for electronic apparatuses, which generally focus on hardware adjustment technologies, including adjusting screen backlight brightness, providing diffuse-reflection anti-glare matte screens, and reducing a wavelength band of harmful blue light through wavelength mapping. The eye protection mode functions may further include eye-use duration statistics and rest reminders, sitting posture detection and reminders. The eye protection mode functions based on hardware condition technologies are easily constrained by hardware, and may not adapt to various environments to achieve a more fine-grained and dynamic adjustment of eye protection mode. How to adapt to parameters of various electronic apparatuses and provide an algorithm-based soft adjustable eye protection mode is one of topics of concern to developers of display products.

The above information disclosed in this section is just for understanding of the background of technical concepts of the present disclosure. Therefore, the above information may contain information that does not constitute a related art.

SUMMARY

In view of the above problems, the present disclosure provides a display method applied to a display device, a display device, and an electronic apparatus.

In an aspect, a display method applied to a display device is provided, where the display device is configured to display according to image data of an image to be displayed, and the image data includes grayscales corresponding to a plurality of primary color components in a color gamut of a display screen of the display device, where the method includes: determining a target color temperature: determining gains of the plurality of primary color components of the display device according to a functional relationship between the gains of the plurality of primary color components of the display device and a color temperature, where the gains of the plurality of primary color components of the display device correspond to the target color temperature, and the functional relationship between the gains of the plurality of primary color components of the display device and the color temperature is predetermined according to a parameter of the display device: acquiring initial image data of the image to be displayed, where the initial image data includes initial grayscales corresponding to the plurality of primary color components: determining adjusted image data of the image to be displayed based on the determined gains of the plurality of primary color components of the display device and the acquired initial image data of the image to be displayed, where the adjusted image data of the image to be displayed includes adjusted grayscales corresponding to the primary color components; and displaying the image to be displayed based on the adjusted image data of the image to be displayed.

According to embodiments of the present disclosure, the determining a target color temperature includes: acquiring an environmental illuminance of an environment in which the display screen is located: determining the target color temperature corresponding to the environmental illuminance according to a mapping relationship between the environmental illuminance and the color temperature, where the mapping relationship between the environmental illuminance and the color temperature is predetermined based on a human eye comfort index.

According to embodiments of the present disclosure, the functional relationship between the gains of the plurality of primary color components of the display device and the color temperature being determined according to a parameter of the display device includes: determining the color gamut of the display screen of the display device: determining a conversion matrix according to the determined color gamut of the display screen, where the conversion matrix is configured to perform a color conversion between a color space of the display screen and a standard color space; and determining the functional relationship between the gains of the plurality of primary color components of the display device and the color temperature according to the conversion matrix.

According to embodiments of the present disclosure, the determining the functional relationship between the gains of the plurality of primary color components of the display device and the color temperature according to the conversion matrix includes: acquiring a mapping table between the color temperature and chromatic coordinates in the standard color space: determining chromatic coordinates of a white dot in the color space of the display screen at a plurality of color temperatures according to the mapping table between the color temperature and the chromatic coordinates in the standard color space and the conversion matrix: determining the gains of the primary color components at the plurality of color temperatures according to the chromatic coordinates of the white dot in the color space of the display screen at the plurality of color temperatures and a predetermined parameter; and fitting the functional relationship between the gains of the plurality of primary color components of the display device and the color temperature according to the gains of the plurality of primary color components at the plurality of color temperatures.

According to embodiments of the present disclosure, the functional relationship between the gains of the plurality of primary color components of the display device and the color temperature is a cubic power functional relationship.

According to embodiments of the present disclosure, the mapping relationship between the environmental illuminance and the color temperature being predetermined based on a human eye comfort index includes: providing a plurality of environmental illuminances: determining a plurality of images to be observed and a plurality of observers: for each provided environmental illuminance, determining a color temperature range for a human eye comfort zone according to a Kruithof curve: traversing the determined color temperature range in a predetermined stride to determine a plurality of color temperatures to be observed: controlling the display device to display the plurality of images to be observed at the plurality of color temperatures to be observed: obtaining multi-dimensional scores of the plurality of images to be observed from the plurality of observers respectively: determining a comprehensive score according to the multi-dimensional scores; and determining a color temperature to be observed having a highest comprehensive score as the color temperature corresponding to the environmental illuminance.

According to embodiments of the present disclosure, the plurality of primary color components include a red component, a green component, and a blue component; and the functional relationship between the gains of the plurality of primary color components of the display device and the color temperature includes: a first functional relationship between the gain of the red component and the color temperature, a second functional relationship between the gain of the green component and the color temperature, and a third functional relationship between the gain of the blue component and the color temperature.

According to embodiments of the present disclosure, the determining gains of a plurality of primary color components of the display device according to a functional relationship between the gains of the plurality of primary color components of the display device and a color temperature includes: determining a first gain of the red component of the display device according to the first functional relationship between the gain of the red component of the display device and the color temperature; determining a second gain of the green component of the display device according to the second functional relationship between the gain of the green component of the display device and the color temperature; and determining a third gain of the blue component of the display device according to the third functional relationship between the gain of the blue component of the display device and the color temperature.

According to embodiments of the present disclosure, the initial image data includes a first initial grayscale corresponding to the red component, a second initial grayscale corresponding to the green component, and a third initial grayscale corresponding to the blue component; and the determining adjusted image data of the image to be displayed based on the determined gains of the plurality of primary color components of the display device and the acquired initial image data of the image to be displayed includes: multiplying the first initial grayscale by the first gain to obtain a first adjusted grayscale of the adjusted image data: multiplying the second initial grayscale by the second gain to obtain a second adjusted grayscale of the adjusted image data; and multiplying the third initial grayscale by the third gain to obtain a third adjusted grayscale of the adjusted image data.

According to embodiments of the present disclosure, the determining the color gamut of the display screen of the display device includes: measuring the chromatic coordinates of the display screen displaying a pure red image, the chromatic coordinates of the display screen displaying a pure green image, the chromatic coordinates of the display screen displaying a pure blue image, and the chromatic coordinates of the display screen displaying a pure white image, respectively; and determining the color gamut of the display screen according to the chromatic coordinates of the display screen displaying the pure red image, the chromatic coordinates of the display screen displaying the pure green image, the chromatic coordinates of the display screen displaying the pure blue image, and the chromatic coordinates of the display screen displaying the pure white image.

According to embodiments of the present disclosure, the multi-dimensional scores include a score in a first dimension, a score in a second dimension and a score in a third dimension, a first dimension represents a comfort of an observer observing a displayed image, a second dimension represents a brightness of the displayed image perceived by the observer observing the displayed image, and a third dimension represents a nervousness of the observer observing the displayed image; and the determining a comprehensive score according to the multi-dimensional scores includes: calculating a weighted sum of the score in the first dimension, the score in the second dimension and the score in the third dimension to determine the comprehensive score.

According to embodiments of the present disclosure, the plurality of images to be observed include a natural scenery image, a people image, and a solid color image.

According to embodiments of the present disclosure, the predetermined parameter is 255.

In another aspect, a display device is provided, where the display device is configured to display according to image data of an image to be displayed, and the image data includes grayscales corresponding to a plurality of primary color components in a color gamut of a display screen of the display device, where the display device includes: a target color temperature determination module configured to determine a target color temperature: a gain determination module configured to determine gains of the plurality of primary color components of the display device according to a functional relationship between the gains of the plurality of primary color components of the display device and a color temperature, where the gains of the plurality of primary color components of the display device correspond to the target color temperature, and the functional relationship between the gains of the plurality of primary color components of the display device and the color temperature is predetermined according to a parameter of the display device: an initial image data acquisition module configured to acquire initial image data of the image to be displayed, where the initial image data includes initial grayscales corresponding to the plurality of primary color components: an adjusted image data determination module configured to determine adjusted image data of the image to be displayed based on the determined gains of the plurality of primary color components of the display device and the acquired initial image data of the image to be displayed, where the adjusted image data of the image to be displayed includes adjusted grayscales corresponding to the primary color components; and an image display module configured to display the image to be displayed based on the adjusted image data of the image to be displayed.

In another aspect, an electronic apparatus is provided, including: a display screen; and a controller configured to control, using the display method as described above, the display screen to display an image to be displayed.

According to embodiments of the present disclosure, the electronic apparatus further includes a sensor configured to acquire an environmental illuminance of an environment in which the display screen is located, and the sensor is communicatively connected with the controller.

BRIEF DESCRIPTION OF THE DRAWINGS

With following descriptions of the present disclosure with reference to the accompanying drawings, other objectives and advantages of the present disclosure may be obvious and the present disclosure may be understood comprehensively.

Figures 1, 2:
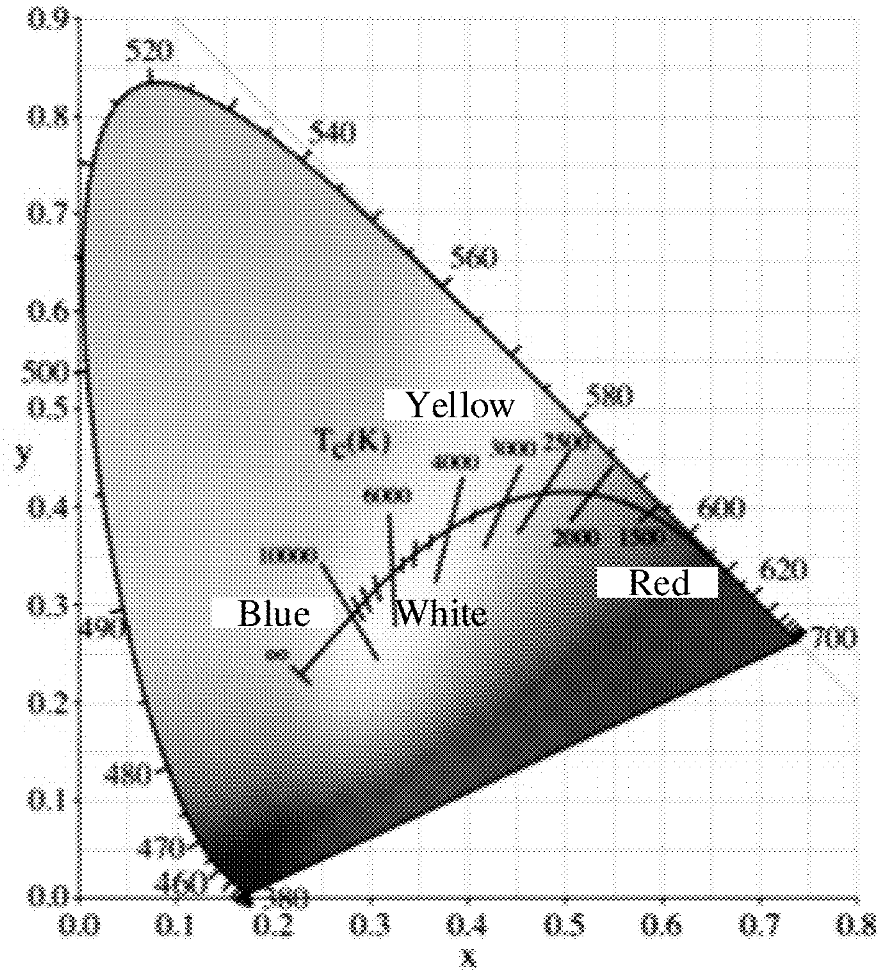
FIG. 1 shows a schematic diagram of a chromaticity map.
FIG. 2 shows a schematic diagram of coordinates of three primary colors and white dots of various color gamut using CIE-1931 xy chromaticity map.

It should be noted that for the sake of clarity, in the accompanying drawings used to describe embodiments of the present disclosure, sizes of layers, structures or regions may be enlarged or reduced, that is, these accompanying drawings are not drawn according to actual scale.

DETAILED DESCRIPTION OF EMBODIMENTS

In the following description, for the purpose of explanation, many specific details are set forth to provide comprehensive understanding of various exemplary embodiments. However, it is obvious that various exemplary embodiments may be implemented without these specific details or with one or more equivalent arrangements. In other cases, well-known structures and devices are shown in block diagrams in order to avoid unnecessarily obscuring the various exemplary embodiments. In addition, the various exemplary embodiments may be different, but need not be exclusive. For example, without departing from the inventive concept, a specific shape, configuration and characteristic of an exemplary embodiment may be used or implemented in another exemplary embodiment.

In the accompanying drawings, for clarity and/or description purposes, sizes and relative sizes of elements may be enlarged. Accordingly, the size and relative size of each element need not to be limited to those shown in the accompanying drawings. When the exemplary embodiments may be implemented differently, the specific process sequence may be different from the sequence described. For example, two consecutively described processes may be performed substantially simultaneously or in a reverse order. In addition, the same reference numeral represents the same element.

When an element is described as being "on", "connected to" or "coupled to" another element, the element may be directly on the another element, directly connected to the another element, or directly coupled to the another element, or an intermediate element may be provided. However, when an element is described as being "directly on", "directly connected to" or "directly coupled to" another element, no intermediate element is provided. Other terms and/or expressions used to describe the relationship between elements, for example, "between" and "directly between", "adjacent" and "directly adjacent", "on" and "directly on", and so on, should be interpreted in a similar manner. In addition, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one selected from X, Y or Z" and "at least one selected from a group consisting of X, Y and Z" may be interpreted as only X, only Y, only Z, or any combination of two or more of X, Y and Z, such as XYZ, XY, YZ and ZZ. As used herein, the term "and/or" includes any and all combinations of one or more of the listed related items.

It should be understood that, although terms "first", "second" and so on may be used herein to describe different elements, those elements should not be limited by those terms. Those terms are just used to distinguish one element from another element. For example, without departing from the scope of the exemplary embodiments, a first element may be named as a second element, and similarly, a second element may be named as a first element.

In order to facilitate the description of the technical solution of the present disclosure, terms involved in some embodiments of the present disclosure will be firstly introduced below (1) Color Temperature Light visible to human eyes is generally composed of a spectrum of seven colors of light formed by three primary colors (red, green, blue, i.e., RGB). A color temperature is a measure of color components of light. When a blackbody is heated continuously, a maximum value of a relative spectral power distribution may shift in a shortwave direction.

For example, a color of a light source may be represented by different colors of light emitted when a blackbody is heated to different temperatures. If a pure black object may absorb all the heat that falls on the pure black object without loss and may also release all the energy generated by heat in the form of "light", it may become different colors depending on a level of the received heat. For example, the blackbody may turn dark red when receiving heat equivalent to 500-550° C., and turn yellow when receiving heat equivalent to 1050-1150° C. Thus, the color component of the light source corresponds to a thermal temperature received by the blackbody. For example, if a color of a blackbody at a certain temperature is exactly the same as a color of a light source, the temperature of the blackbody is referred to as a color temperature of the light source, of which a unit is Kelvin (K).

FIG. 1 shows a schematic diagram of a chromaticity map (referring to a chromaticity map developed by the International Commission on Illumination (CIE)). As shown in FIG. 1, as the temperature increases, the blackbody color shifts on the chromaticity map and forms a curve trajectory. The trajectory starts from a red region in a lower right corner, passes through a yellow region and a white region in the middle, and reaches a blue region on the left. Such curve trajectory is referred to as a Planck trajectory or a blackbody trajectory.

For example, the light emitted by the sun is very close to the blackbody spectrum. A surface temperature of the sun is about 5500 K, and the light emitted by a blackbody at this temperature is substantially white. Among several standard white dots specified by the CIE, D50, D55 and D65 are commonly used white dots, which are defined by reference to blackbody radiation at 5000 K, 5500 K and 6500 K and simulate illumination under different conditions (e.g., horizon illumination, morning and afternoon outdoors, and midday outdoors). D65 represents the white dot on which a color space sRGB depends. D50 light source (with a color temperature of 5000K) is a light source with a slightly warm color of a luminous body. According to ISO3664:2000, the D50 light source is a true standard color temperature for observing colors. The D65 light source (with a color temperature of 6500K) is a light source with a slightly cool color of a luminous body. In Europe and the United States, the D65 light source is gradually replaced by the D50 light source, but in China, D65 is still one of widely used standard color temperatures.

Different color temperatures give people different environmental feelings. According to the color temperature, light sources may be classified into warm light, neutral light, and cool light.

Warm light has a color temperature below 3300 K. The warm light is similar to incandescent lamp, and when the color temperature is around 2000 K, the warm light is similar to candlelight, which contains abundant red light component and may give people a warm, healthy, comfortable and sleepy feeling. The warm light is suitable for families, residences, dormitories, hotels or places with a low temperature. It is good to adjust the light source to warm light for a period of time before going to bed, and the lower the color temperature, the less it may suppress a secretion of melatonin.

Neutral light is also referred to as cool white light, which has a color temperature between 3300 K and 5300 K. The neutral light is soft and may give people a pleasant, comfortable and peaceful feeling. It is suitable for shops, hospitals, offices, restaurants, waiting rooms and other places.

Cool light is also referred to as daylight color, which has a color temperature above 5000 K. The cool light is close to natural light, which is bright and may make people concentrated and not easy to fall asleep. It is suitable for offices, conference rooms, classrooms, drawing rooms, design rooms, reading rooms of libraries, exhibition windows and other places.

(2) Color Gamut of Screen

Different screens have differences in color gamut. The color gamut refers to a sum of colors that a color system may produce. Narrowly defined color gamut refers specifically to a technical capability of a color display system (e.g., a display or a printer). A practical system supports a sub-space of the CIE chromaticity map, which sub-space is generally determined by xy values of three primary colors. The three primary colors form a triangle that determines a maximum range of colors that a color system may produce.

FIG. 2 shows a schematic diagram of coordinates of three primary colors and white dots of various color gamut using CIE-1931 xy chromaticity map. A typical color gamut representation method is shown in FIG. 2, which shows definition values for three common color gamut, where RGB represents the three primary colors and W represents the white dot. BT.709 color gamut corresponds to the sRGB color space commonly used in the field of computer, BT.2020 color gamut is a standard color gamut for ultra-high-definition video production, and DCI-P3 color gamut is a color gamut commonly used for movies.

In particular, the color gamut is not limited to the BT.709 color gamut, the BT.2020 color gamut and the DCI-P3 color gamut in embodiments of the present disclosure.

(3) Environmental Illuminance

The environmental illuminance refers to brightness of ambient light, and its unit of measurement is "lux" or "lx", which indicates a luminous flux received per unit area on a surface of a subject.

(4) Kruithof Curve

Kruithof curve lays a foundation for the theory of color vision and also provides a reference for a choice of lighting sources under natural conditions. It describes regions of illuminance level and color temperature that are generally considered comfortable or satisfactory to observers. The curve was constructed from psychophysical data collected by Dutch physicist, Arie Andries Kruithof, although original experimental data did not appear on the curve. Lighting conditions within a bounded region are empirically evaluated as pleasant or natural, while conditions outside the region are considered uncomfortable, unpleasant, or unnatural. The Kruithof curve is a sufficient model for describing sources of joy that are thought to be natural or very similar to a blackbody.

Figure 3:
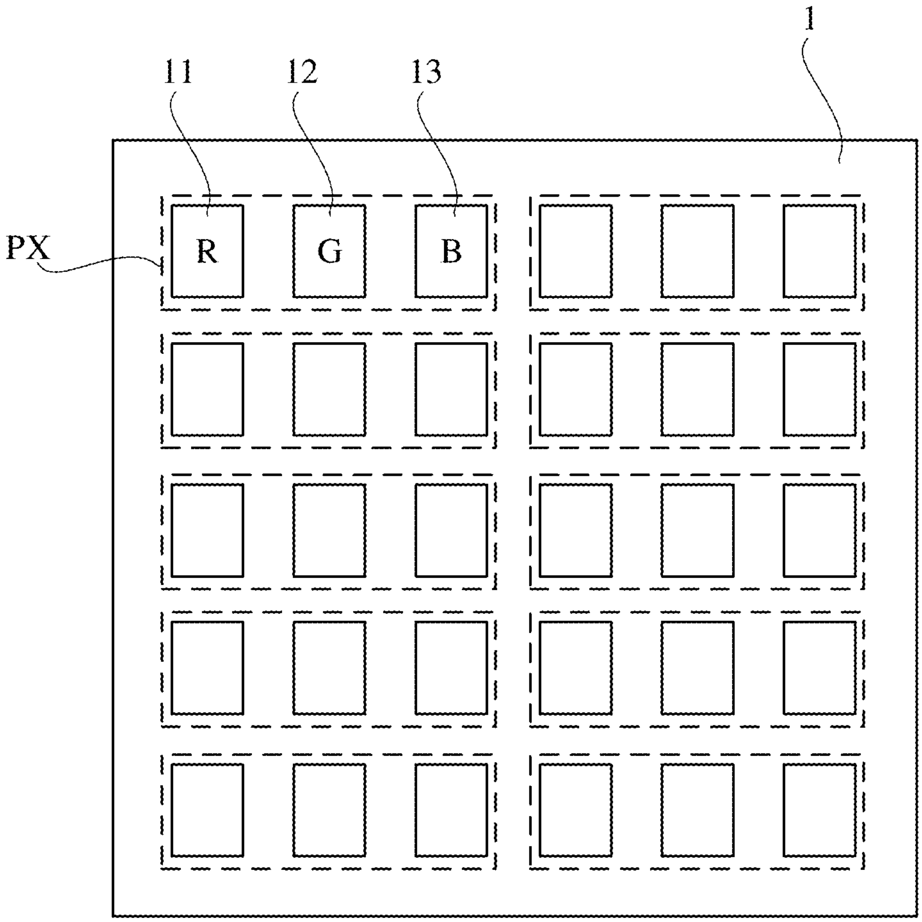
FIG. 3 shows a schematic structural diagram of a display panel according to some exemplary embodiments of the present disclosure.

FIG. 3 shows a schematic structural diagram of a display panel according to some exemplary embodiments of the present disclosure.

As shown in FIG. 3, a display panel 1 includes a plurality of pixel units PX arranged in an array (as shown by the dotted box in FIG. 3). For example, each pixel unit PX may include a plurality of sub-pixel units, such as a red sub-pixel unit 11, a green sub-pixel unit 12, and a blue sub-pixel unit 13 shown in FIG. 3, so as to achieve color display. For example, each sub-pixel unit includes a pixel driving circuit and a light-emitting diode (LED), and the pixel driving circuit may drive the light-emitting diode to emit light according to a received grayscale voltage signal. For example, the light-emitting diode may include but not be limited to organic light-emitting diode (OLED), quantum dot light-emitting diode (QLED), and inorganic light-emitting diode, etc.

For example, an image to be displayed may include a plurality of pixels, and the plurality of pixels are respectively displayed through a plurality of pixel units PX on the display panel 1. Image data of the image to be displayed includes image data of each pixel, and the image data of each pixel includes a grayscale corresponding to each of a plurality of primary color components, such as a grayscale of a red component, a grayscale of a green component, and a grayscale of a blue component, etc. Therefore, the pixel units PX on the display panel 1 may display according to the corresponding image data of the pixels of the image to be displayed, so that the image to be displayed may be displayed on the display panel 1. For example, specifically, the red sub-pixel unit 11 in each pixel unit displays according to the grayscale of the red component in the corresponding image pixel (the luminous brightness is positively correlated with the grayscale), the green sub-pixel unit 12 in each pixel unit displays according to the grayscale of the green component in the corresponding image pixel (the luminous brightness is positively correlated with the grayscale), and the blue sub-pixel unit 13 in each pixel unit displays according to the grayscale of the blue component in the corresponding image pixel (the luminous brightness is positively correlated with the grayscale), so that the light of different colors emitted by the plurality of sub-pixel units in each pixel unit is mixed together to produce a desired color, then each pixel unit may display the corresponding image pixel.

When the display panel 1 displays, the red sub-pixel unit 11 may emit red light (R), the green sub-pixel unit 12 may emit green light, and the blue sub-pixel unit 13 may emit blue light (G). Generally speaking, blue light (G) has a shortest spectrum and a strongest penetration power, and is thus essential to obtain a clear and bright image. However, if a significant amount of blue light is contained in the light emitted by the display panel 1, it may cause a significant harm to user eyes when a user watches a screen of an intelligent electronic apparatus for a long time.

In some embodiments, the display panel 1 may be applied to a display device. The display device may display a text, an image, a video, or other information. For example, the display device may include a display panel 1, an interface circuit, a timing controller TCON and a data driver integrated circuit, etc. Examples of the display device include a liquid crystal display device (LCD), an organic light-emitting diode display device (OLED), a plasma display device, etc.

The display device may be applied to, for example, an electronic apparatus. The electronic apparatus according to embodiments of the present disclosure may be an apparatus having a display function, that is, an apparatus including the above-mentioned display device. For example, the electronic apparatus may be a smart phone, a mobile phone, a video telephone, an e-book reader, a desktop personal computer (PC), a laptop PC, a netbook PC, a personal digital assistant (PDA), a portable multimedia player (PMP), a medical apparatus, a camera, a wearable apparatus (such as a head-mounted apparatus, electronic clothing, electronic bracelet, electronic necklace, electronic accessory, electronic tattoo, or smart watch), etc. The electronic apparatus according to some embodiments may be any combination of the above-mentioned apparatuses. In addition, the electronic apparatus according to various embodiments may be a flexible apparatus. Those skilled in the art should be aware that the electronic apparatus according to various embodiments of the present disclosure is not limited to the above-mentioned apparatuses.

A variety of electronic apparatuses available on the market provide a variety of eye protection modes. For example, the eye protection modes based on hardware adjustment technology may include anti-blue light glasses, anti-blue light films, and matte screens, etc., which may reduce user experience and increase consumer spending. Some software adjustable eye protection modes may provide different colors and brightness, such as eye protection green, night mode, or day mode. The eye protection modes provided in the related art are fixed, such as installing corresponding hardware on the electronic apparatus in advance, or providing a fixed software adjustable eye protection mode, which may need the user to manually set a current color temperature. These methods are difficult to achieve an ideal effect and inconvenient for operation, may not achieve an eye protection effect in real time according to parameters of a specific electronic apparatus (such as the parameters of the display device), and may not perform a more fine-grained and dynamic eye protection adjustment in combination with the parameters of the specific electronic apparatus and current environmental conditions.

Based on the above problems, embodiments of the present disclosure provide a display method applied to a display device, a display device, and an electronic apparatus, which will be described in detail below with reference to FIG. 4 to FIG. 17.

Figure 4:
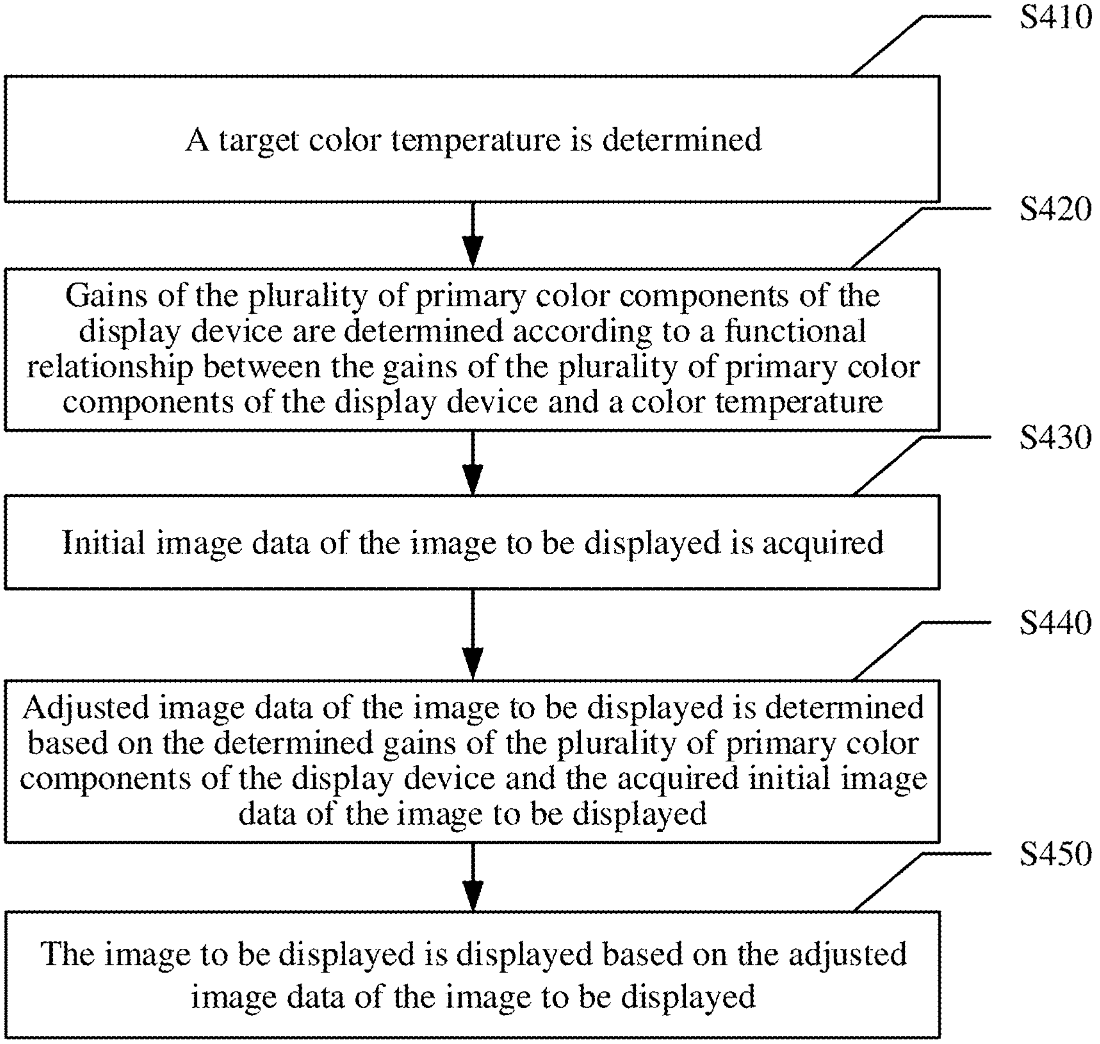
FIG. 4 shows a flowchart of a display method applied to a display device according to some exemplary embodiments of the present disclosure.

FIG. 4 shows a flowchart of a display method applied to a display device according to some exemplary embodiments of the present disclosure.

As shown in FIG. 4, the display method applied to the display device in such embodiments may include operation S410 to operation S450. The display device may display according to image data of an image to be displayed, and the image data includes grayscales corresponding to a plurality of primary color components in a color gamut of a display screen of the display device.

In operation S410, a target color temperature is determined.

For example, the target color temperature may be determined according to at least one selected from an input information from a user, an information in the display device, or an information outside the display device.

For example, the input information from the user may include a set value of the target color temperature that is input by the user through peripherals, speeches, gestures, body postures, and eye movements. The information in the display device may include the image data of the image to be displayed, such as the target color temperature for different image contents, and may also include a real-time performance information of a current apparatus, such as a battery level, a running memory, or an internal memory. The information outside the display device includes an environmental illuminance or a user type, etc. For example, different environmental illuminances, or users of different age groups, genders or occupations may prefer different target color temperatures.

For example, in practical applications, the target color temperature may be selected by the user by touching a graphical control on the display device.

For example, different levels of illuminance may be provided in a candlelit environment, an environment of lighting by tungsten lamp, an environment of lighting by incandescent lamp, an outdoor environment in the morning or afternoon, or environments in different weather conditions. The display device may automatically determine the target color temperature corresponding to any environmental illuminance, so that the eye protection effect and the comfort of the user using a mobile phone may be improved.

For example, the target color temperature may be determined under different environmental illuminances in combination with the current real-time performance information, so as to reduce computational complexity while maintaining user comfort during phone use, and thus achieve the effect of reducing power consumption when enabling automatic color temperature adjustment function.

Exemplary, it is possible to determine the target color temperature at regular intervals, e.g., every 1 second (just for example). It is also possible to dynamically determine the target color temperature in response to changes in at least one of the input information from the user, the information in the display device or the information outside the display device, so as to display with an optimal color temperature in real time and improve the eye protection effect.

In operation S420, gains of the plurality of primary color components of the display device are determined according to a functional relationship between the gains of the plurality of primary color components of the display device and a color temperature. The gains of the plurality of primary color components of the display device correspond to the target color temperature, and the functional relationship between the gains of the plurality of primary color components of the display device and the color temperature is predetermined according to a parameter of the display device.

Exemplarily, the gain is an adjustable parameter of a primary color component of the display device. It is possible to determine same or different gains for the plurality of primary color components.

For example, in some examples, the above-mentioned plurality of primary color components may include three primary color components, and for example, the three primary color components include a red component (red, R), a green component (green, G), and a blue component (blue, B), but embodiments of the present disclosure are not limited to this. It should be noted that these three primary color components of red, green and blue are taken as examples in describing embodiments of the present disclosure, but should not be regarded as limitations to the present disclosure.

Exemplarily, the parameter of the display device may include a display-related parameter, such as a color gamut, a resolution, a refresh rate, a contrast, a display panel model and other attributes of the display screen. The display screen includes the display panel as shown in FIG. 1. Since different display devices such as different models or brands of mobile phones, tablet computers, desktop computers or other electronic apparatuses have different parameters, it is possible to provide more-targeted eye protection functions by predetermining the functional relationship between the gains of the plurality of primary color components of each display device and the color temperature according to the parameter of the display device.

In operation S430, initial image data of the image to be displayed is acquired. The initial image data includes initial grayscales corresponding to the plurality of primary color components.

In operation S440, adjusted image data of the image to be displayed is determined based on the determined gains of the plurality of primary color components of the display device and the acquired initial image data of the image to be displayed. The adjusted image data of the image to be displayed includes adjusted grayscales corresponding to the plurality of primary color components.

Exemplarily, it is possible to determine the gains corresponding to the red component, the green component and the blue component of some or all of the pixels in the initial image data, and then adjust the color temperature according to the corresponding gains.

In operation S450, the image to be displayed is displayed based on the adjusted image data of the image to be displayed.

In some embodiments, it may be determined that a partial or entire display region of the display screen displays with the target color temperature value, and then the image data in the partial or entire display region may be adjusted accordingly. For example, if the entire display region of the display screen is a target adjustment region, it is possible to obtain the adjusted image data of all pixels of the image to be displayed. For example, in a one-handed mode, in a case of displaying in a lower half region, it is possible to determine the adjusted image data of the pixels in the lower half region according to the display content of the image to be displayed, and certainly, it is also possible to display the entire image content in the lower half region. In other embodiments, it may be determined that a partial or entire region of the image to be displayed is displayed at the target color temperature, and then the image data in the partial or entire region of the image may be adjusted accordingly.

According to embodiments of the present disclosure, after the target color temperature is determined, the gains of the plurality of primary color components of the display device may be determined according to the functional relationship between the gains of the plurality of primary color components of the display device and the color temperature. Since the function relationship is predetermined according to the parameter of the display device, the eye protection mode with intelligent adjustment of color temperature may adapt to a variety of screen terminals, so that the blue light of the screen may be effectively reduced, and a soft adjustment of the screen may be achieved. For example, it is possible to achieve a higher color temperature and greater brightness in a bright environment while avoiding glare in a dim environment, so as to achieve the eye protection effect.

Figure 5:
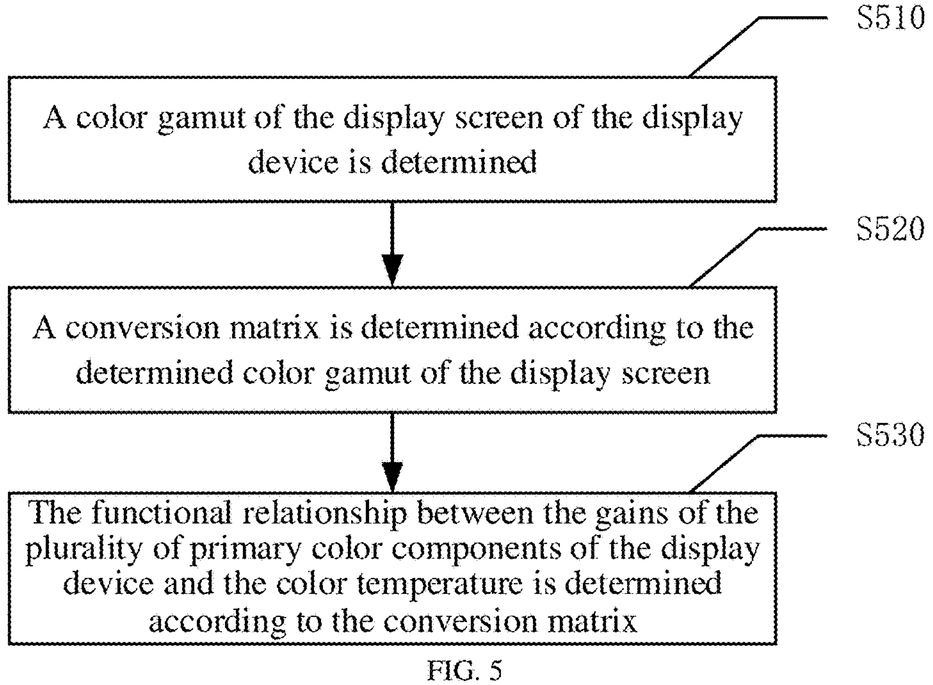
FIG. 5 shows a flowchart of predetermining a functional relationship according to some exemplary embodiments of the present disclosure.

FIG. 5 shows a flowchart of predetermining the functional relationship according to some exemplary embodiments of the present disclosure.

As shown in FIG. 5, in such embodiments, predetermining the functional relationship between the gains of the plurality of primary color components of the display device and the color temperature according to the parameter of the display device may include operation S510 to operation S530.

In operation S510, a color gamut of the display screen of the display device is determined.

In some embodiments, determining the color gamut of the display screen of the display device may include: measuring a chromatic coordinate of the display screen displaying a pure red image, a chromatic coordinate of the display screen displaying a pure green image, a chromatic coordinate of the display screen displaying a pure blue image, and a chromatic coordinate of the display screen displaying a pure white image; and determining the color gamut of the display screen according to the chromatic coordinate of the display screen displaying the pure red image, the chromatic coordinate of the display screen displaying the pure green image, the chromatic coordinate of the display screen displaying the pure blue image, and the chromatic coordinate of the display screen displaying the pure white image.

For example, it is possible to determine a color gamut of a screen by respectively measuring the chromatic coordinates of the screen displaying four colors, including pure red (255,0,0), pure green (0,255,0), pure blue (0,0,255) and pure white (255,255,255), thereby obtaining specific color gamut of different screen terminals.

In operation S520, a conversion matrix is determined according to the determined color gamut of the display screen. The conversion matrix is used to perform a color conversion between a color space of the display screen and a standard color space.

In operation S530, the functional relationship between the gains of the plurality of primary color components of the display device and the color temperature is determined according to the conversion matrix.

Referring to FIG. 2, after the color gamut of the display screen is determined, (x, y, z) coordinates of the three primary colors (such as red, green, blue) and white dots may be obtained, where a sum of x, y and z is equal to 1. When an arbitrary color is represented by linear (r, g, b) values, the r, g, b values may determine a proportional relationship of the three primary colors. Then, the color may be converted from RGB space (i.e., color space) to XYZ space (i.e., standard color space) by a matrix conversion, as shown in Equation (1).

$$\begin{pmatrix} X \\ Y \\ Z \end{pmatrix} = \begin{pmatrix} x_r & x_g & x_b \\ y_r & y_g & y_b \\ z_r & z_g & z_b \end{pmatrix} \begin{pmatrix} r\cdot(X+Y+Z)_r \\ g\cdot(X+Y+Z)_g \\ b\cdot(X+Y+Z)_b \end{pmatrix} = \begin{pmatrix} x_r & x_g & x_b \\ y_r & y_g & y_b \\ z_r & z_g & z_b \end{pmatrix} \begin{pmatrix} (X+Y+Z)_r & 0 & 0 \\ 0 & (X+Y+Z)_g & 0 \\ 0 & 0 & (X+Y+Z)_b \end{pmatrix} \begin{pmatrix} r \\ g \\ b \end{pmatrix} \tag{1}$$

where $$\begin{pmatrix} x_r & x_g & x_b \\ y_r & y_g & y_b \\ z_r & z_g & z_b \end{pmatrix}$$

represents the chromatic coordinates of the three primary colors of the color gamut defined by different standards, and the values are as shown in FIG. 2 but not limited to FIG. 2.

$$\begin{pmatrix} (X+Y+Z)_r \\ (X+Y+Z)_g \\ (X+Y+Z)_b \end{pmatrix} = \begin{pmatrix} x_r & x_g & x_b \\ y_r & y_g & y_b \\ z_r & z_g & z_b \end{pmatrix}^{-1} \begin{pmatrix} X \\ Y \\ Z \end{pmatrix}_{D65} \tag{2}$$

The left side of Equation (1) may be $$\begin{pmatrix} X \\ Y \\ Z \end{pmatrix}_{D65}$$

which is a tristimulus value of the white dot of D65 and is just an example. X, Y and Z represent parameters as follows: X represents the amount of light that is perceived as red (a stimulus value perceived by humans): Y represents the amount of light that is perceived as green (a stimulus value perceived by humans): Z represents the amount of light that is perceived as blue (a stimulus value perceived by humans). x=X/(X+Y+Z), y=Y/(X+Y+Z), z=z/(X+Y+Z).

Referring to FIG. 1, a conversion matrix M is obtained, as shown in Equation (3).

$$M = \begin{pmatrix} x_r & x_g & x_b \\ y_r & y_g & y_b \\ z_r & z_g & z_b \end{pmatrix} \begin{pmatrix} (X+Y+Z)_r\ 0\ 0 \\ 0\ (X+Y+Z)_g\ 0 \\ 0\ 0\ (X+Y+Z)_b \end{pmatrix} \tag{3}$$

Referring to Equation (1), $$\begin{pmatrix} r \\ g \\ b \end{pmatrix}$$

is a normalized representation of RGB space.

For example, in some examples, a grayscale signal for each primary color component may be an 8-bit digital signal. In this case, the grayscale for each primary color component may be in a range of [0, 255] in the RGB space, and the (r, g, b) values may be in a range of [0, 1], where r=(R/255)^gammaR, g=(G/255)^gammaG, b=(B/255)^gammaB.

For example, in other examples, the grayscale signal for each primary color component may be a 12-bit digital signal. In this case, the grayscale for each primary color component may be in a range of [0, 4095] in RGB space, and the (r, g, b) values may be in a range of [0, 1]. It should be understood that the number of bits of the gray-scale signal for each primary color component is not limited in embodiments of the present disclosure. r=(R/4095)^gammaR, g=(G/4095)^gammaG, b=(B/4095)^gammaB, where gammaR, gammaG, and gammaB are respective gamma values of three channels, which are used to convert non-linear RGB to linear rgb.

For example, the color gamut of different display screens may be different and may have respective specific conversion matrices M as shown in Equation (3). The functional relationship between the gains of the plurality of primary color components of the display device and the color temperature may be determined by combining Equation (1) to Equation (3), which is further described below with reference to FIG. 6.

According to embodiments of the present disclosure, based on the above methods, it is possible to measure the color gamut of each display screen and obtain the conversion matrix between the XYZ color space and the RGB color space, so that a degree of adaptation between the function relationship and the display screen may be improved, an accuracy of the adjusted image data of the image to be displayed may be enhanced, and the adjusted image to be displayed may be displayed with a good eye protection effect.

Figure 6:
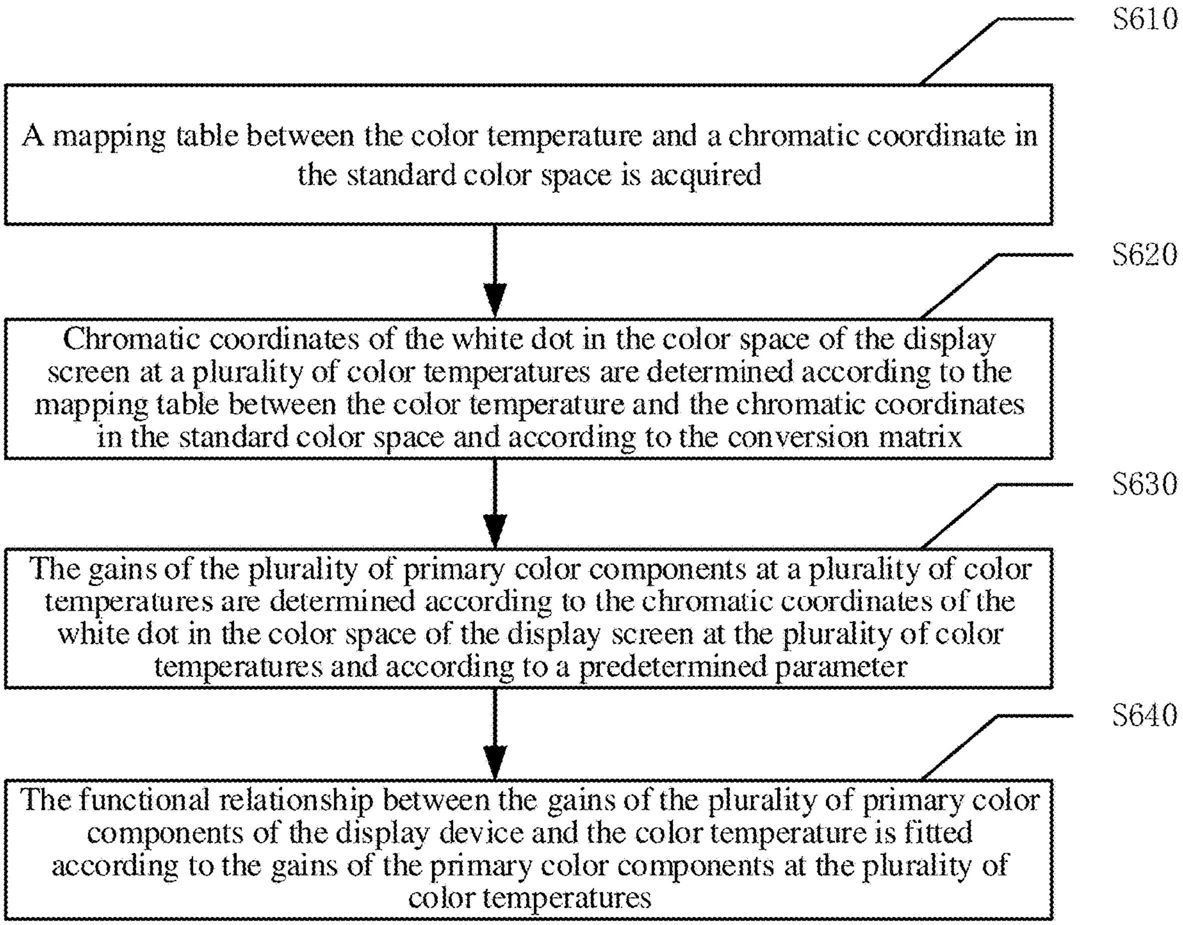
FIG. 6 shows a flowchart of predetermining a functional relationship according to other exemplary embodiments of the present disclosure.

FIG. 6 shows a flowchart of predetermining the functional relationship according to other exemplary embodiments of the present disclosure.

As shown in FIG. 6, predetermining the functional relationship between the gains of the plurality of primary color components of the display device and the color temperature according to the conversion matrix in operation S530 may include operation S610 to operation S640.

In operation S610, a mapping table between the color temperature and a chromatic coordinate in the standard color space is acquired.

Exemplarily, the mapping table may contain the xyz coordinates corresponding to the color temperature given by the CIE, such as the mapping table of CIE1931, CIE1976, or CIE1964, etc. The chromatic coordinates corresponding to various color temperatures under the blackbody trajectory may be determined by table look-up. Table 1 of the mapping table shows chromatic coordinates corresponding to some color temperatures at 2 deg in the CIE1964.

TABLE 1

| Color temperature (K) | x coordinate | y coordinate |
|---|---|---|
| | . . . | |
| 2600 | 0.4696 | 0.4173 |
| 2700 | 0.4614 | 0.4158 |
| | . . . | |
| 3300 | 0.4192 | 0.4018 |
| | . . . | |

In operation S620, chromatic coordinates of the white dot in the color space of the display screen at a plurality of color temperatures are determined according to the mapping table between the color temperature and the chromatic coordinates in the standard color space and according to the conversion matrix.

It is possible to traverse the chromatic coordinates corresponding to the color temperature in the mapping table, and obtain the (r, g, b) value of the white dot on the screen at different color temperatures by Equation (4).

$$\begin{pmatrix} r \\ g \\ b \end{pmatrix} = M^{-1} \begin{pmatrix} x \\ y \\ z \end{pmatrix} \tag{4}$$

In operation S630, the gains of the plurality of primary color components at a plurality of color temperatures are determined according to the chromatic coordinates of the white dot in the color space of the display screen at the plurality of color temperatures and according to a predetermined parameter.

In some embodiments, the predetermined parameter is 255.

The (r, g, b) values of the white dot are respectively divided by 255 to obtain the gains of the (r, g, b) values. The gains are calculated as shown in Equation (5).

$$\text{gain}_r^T = \frac{r}{255} \tag{5}$$

$$\text{gain}_g^T = \frac{g}{255}$$

$$\text{gain}_b^T = \frac{g}{255}$$

In operation S640, the functional relationship between the gains of the plurality of primary color components of the display device and the color temperature is fitted according to the gains of the primary color components at the plurality of color temperatures.

In some embodiments, the functional relationship between the gains of the plurality of primary color components of the display device and the color temperature is a cubic power functional relationship. As shown in Equation (6), Equation (7) and Equation (8) below, in some embodiments, the functional relationship between the gains of the plurality of primary color components of the display device and the color temperature may include: a first functional relationship between a gain f(T) of a red component and a color temperature T, a second functional relationship between a gain g(T) of a green component and the color temperature T, and a third functional relationship between a gain h(T) of a blue component and the color temperature T.

$$f(T) = A1*T^3 + B1*T^2 + C1*T + D1 \tag{6}$$

$$g(T) = A2*T^3 + B2*T^2 + C2*T + D2 \tag{7}$$

$$h(T)A3*T^3 + B3*T^2 + C3*T + D3 \tag{8}$$

where A1, A2, A3, B1, B2, B3, C1, C2, C3, D1, D2 and D3 are constant coefficients obtained by fitting, which may have values, for example, between 0 and 100.

An example is given as follows.

$$f(T) = 0.1*T^3 + 0.256*T^2 + 3*T + 25$$

$$g(T) = 2*T^3 + 0.56*T^2 + 0.7*T + 12$$

$$h(T) = 1.3*T^3 + 0.5*T^2 + 0.78*T + 0.58$$

It should be noted that the above is just for example. The constant coefficients may be affected by the color gamut of a specific display screen, the conversion matrix, and the chromatic coordinates in the mapping table, etc., and the present disclosure is not limited to the above-mentioned values of the constant coefficients.

In other embodiments, the functional relationship between the gains of the plurality of primary color components of the display device and the color temperature may be a first power functional relationship, a second power functional relationship, or more power functional relationship.

In other embodiments, the functional relationship between the gains of the plurality of primary color components of the display device and the color temperature may also be obtained by means of exponential fitting, Gaussian fitting or logarithmic fitting.

According to embodiments of the present disclosure, by fitting, it is convenient to obtain the functional relationship between the gains of the plurality of primary color components of the display device and the color temperature, the obtained function relationship is accurate, and it is possible to obtain unique function relationships for various screens by combining the conversion matrix.

Figure 7:
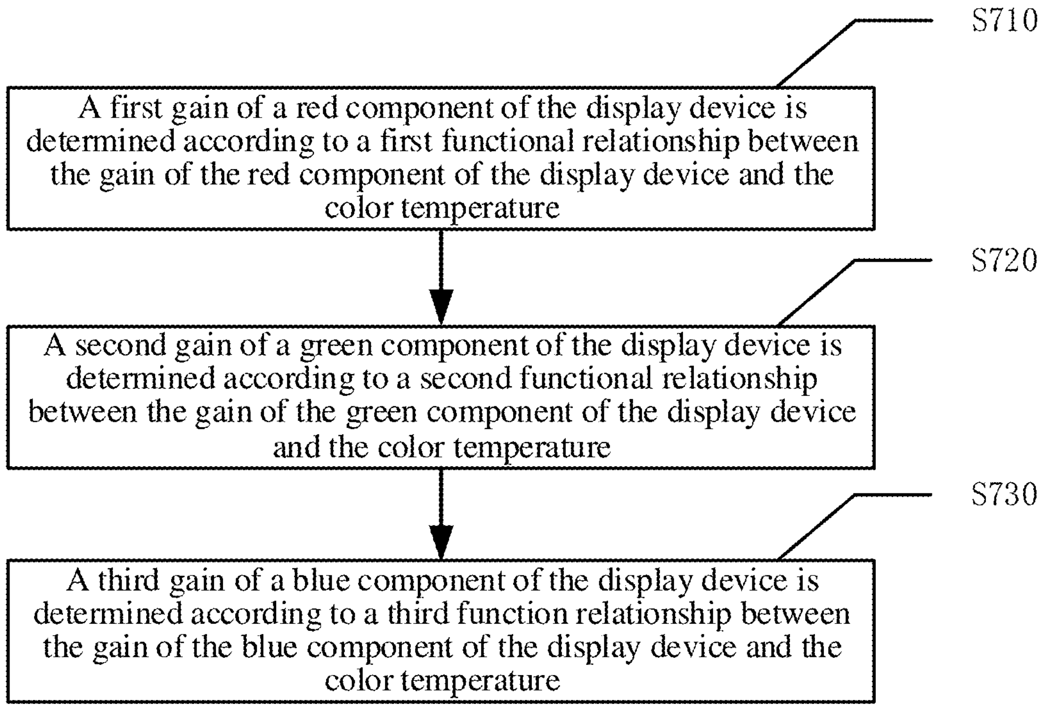
FIG. 7 shows a flowchart of determining gains of a plurality of primary color components of a display device according to some exemplary embodiments of the present disclosure.

FIG. 7 shows a flowchart of determining the gains of the plurality of primary color components of the display device according to some exemplary embodiments of the present disclosure.

As shown in FIG. 7, determining the gains of the plurality of primary color components of the display device according to the functional relationship between the gains of the plurality of primary color components of the display device and the color temperature in operation S420 includes operation S710 to operation S730.

In operation S710, a first gain of a red component of the display device is determined according to a first functional relationship between the gain of the red component of the display device and the color temperature.

In operation S720, a second gain of a green component of the display device is determined according to a second functional relationship between the gain of the green component of the display device and the color temperature.

In operation S730, a third gain of a blue component of the display device is determined according to a third function relationship between the gain of the blue component of the display device and the color temperature.

Referring to Equation (6), Equation (7) and Equation (8), the target color temperature determined by operation S410 is input into Equation (6) to obtain a first gain $gain_r^T$, the target color temperature is input into Equation (7) to obtain a second gain $gain_g^T$, and the target color temperature is input into Equation (8) to obtain a third gain $gain_b^T$.

According to embodiments of the present disclosure, determining respective gains of the red component, the green component and the blue component may help adaptive adjustment of each primary color component to achieve a higher flexibility and accuracy, and the eye protection effect may be further improved.

Figure 8:
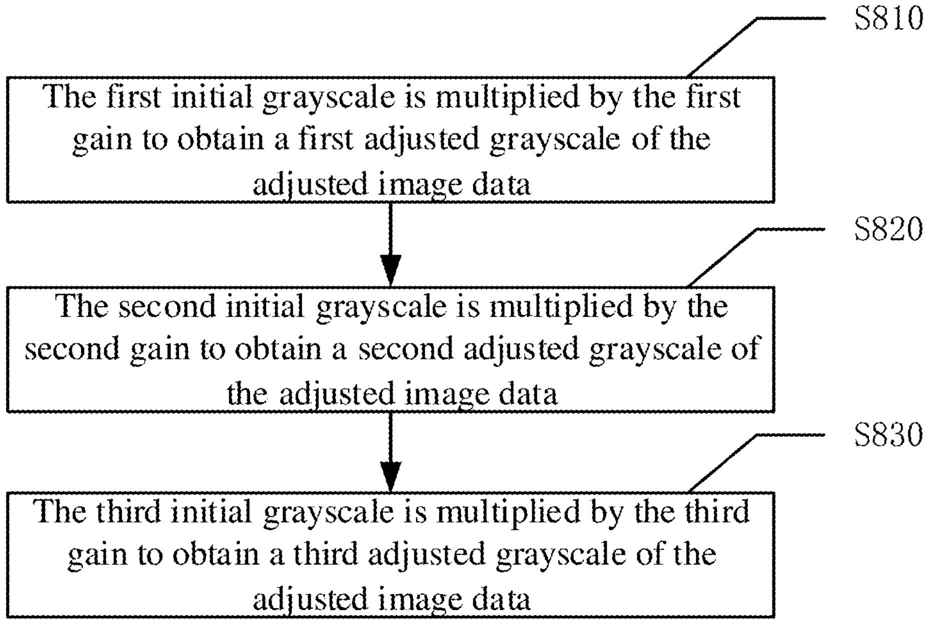
FIG. 8 shows a flowchart of determining adjusted gray-scales according to some exemplary embodiments of the present disclosure.

FIG. 8 shows a flowchart of determining adjusted grayscales according to some exemplary embodiments of the present disclosure.

As shown in FIG. 8, determining the adjusted image data of the image to be displayed based on the determined gains of the plurality of primary color components of the display device and the acquired initial image data of the image to be displayed in operation S440 may include operation S810 to operation S830. The initial image data includes a first initial grayscale corresponding to the red component, a second initial grayscale corresponding to the green component, and a third initial grayscale corresponding to the blue component.

In operation S810, the first initial grayscale is multiplied by the first gain to obtain a first adjusted grayscale of the adjusted image data.

In operation S820, the second initial grayscale is multiplied by the second gain to obtain a second adjusted grayscale of the adjusted image data.

In operation S830, the third initial grayscale is multiplied by the third gain to obtain a third adjusted grayscale of the adjusted image data.

In some embodiments, the first adjusted grayscale, the second adjusted grayscale and the third adjusted grayscale are as shown in Equation (9).

$$\begin{pmatrix} R2 = R1 * gain_r^T \\ G2 = G1 * gain_g^T \\ B2 = B1 * gain_b^T \end{pmatrix} \quad (9)$$

where R1, G1 and B1 respectively represent the first initial grayscale, the second initial grayscale, and the third initial grayscale, and R2, G2 and B2 respectively represent the first adjusted grayscale, the second adjusted grayscale and the third adjusted grayscale.

In other embodiments, since the gains are ratios of the (r, g, b) values to 255 respectively, in order to avoid overflowing from the value range, it is possible to obtain r1, g1 and b1 based on R1, G1 and B1, then multiply r1, g1 and b1 by corresponding gains to obtain r2, g2 and b2, and finally convert r2, g2 and b2 to R2, G2 and B2.

According to embodiments of the present disclosure, each pixel in the image data in RGB format have corresponding RGB color components. By obtaining the adjusted grayscales in the RGB format of the adjusted image data, the image to be displayed may be output and displayed after the color temperature is adjusted, so as to obtain a good eye protection effect.

Figure 9:
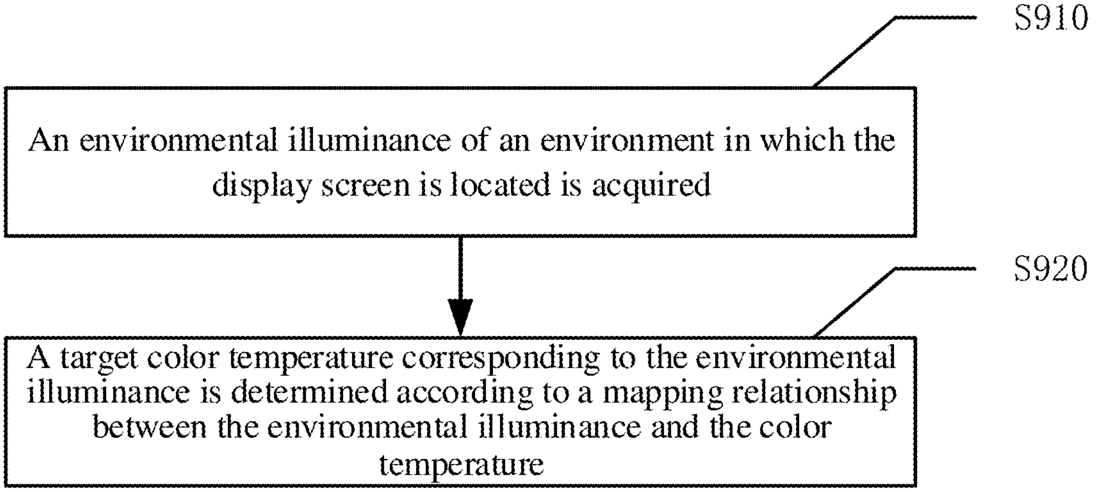
FIG. 9 shows a flowchart of determining a target color temperature according to some exemplary embodiments of the present disclosure.

FIG. 9 shows a flowchart of determining a target color temperature according to some exemplary embodiments of the present disclosure.

As shown in FIG. 9, the display method applied to the display device in such embodiments may include operation S410 to operation S490.

In operation S910, an environmental illuminance of an environment in which the display screen is located is acquired.

For example, when using a mobile phone or other imaging apparatuses indoors to photograph a scene outside a window, an indoor environment in which the mobile phone is located is the environment in which the display screen is located. When using a mobile phone or tablet computer to watch a movie outdoors, an outdoor environment is the environment in which the display screen is located. The above-mentioned environmental illuminance may be obtained by a sensor in the display screen, or may be determined by acquiring an environmental illuminance of a current region on the network, or may be calculated after obtaining a current weather condition, a light source, an occlusion and other environmental information. The method of obtaining the environmental illuminance is not limited in the present disclosure.

In operation S920, a target color temperature corresponding to the environmental illuminance is determined according to a mapping relationship between the environmental illuminance and the color temperature. The mapping relationship between the environmental illuminance and the color temperature is predetermined based on a human eye comfort index.

Exemplarily, the display method in such embodiments may be used for an electronic apparatus such as notebook, funbook, tablet computer or mobile phone, etc. used in the context of remote office, remote online classes, reading, watching videos or game entertainment.

According to embodiments of the present disclosure, it is possible to achieve a good human eyes comfort experience by adjusting the color temperature of the screen display in real time in combination with the parameter of the display device under different environmental illuminance conditions.

Figure 10:
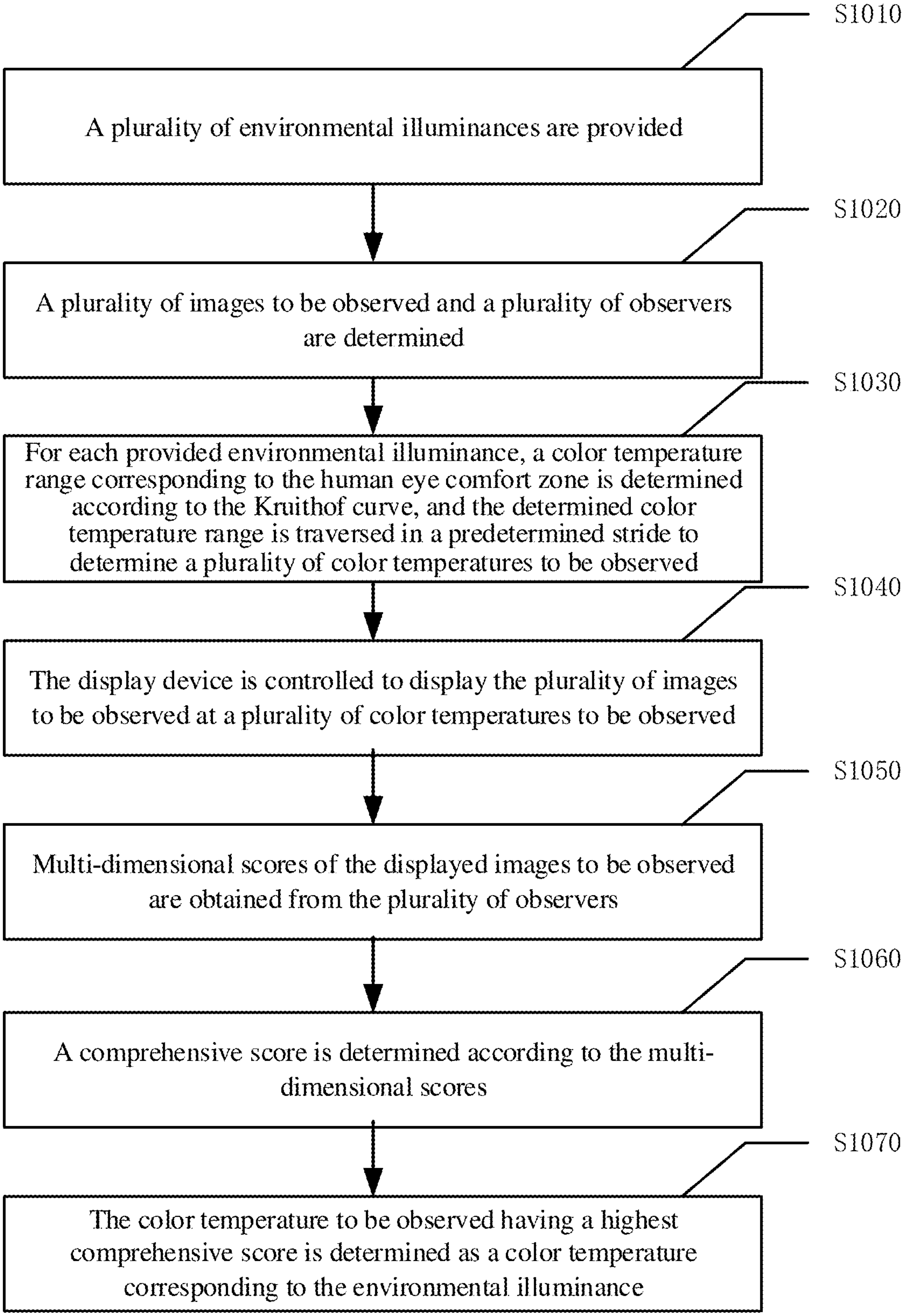
FIG. 10 shows a flowchart of predetermining a mapping relationship between an environmental illuminance and a color temperature according to some exemplary embodiments of the present disclosure.

FIG. 10 shows a flowchart of predetermining a mapping relationship between the environmental illuminance and the color temperature according to some exemplary embodiments of the present disclosure.

As shown in FIG. 10, predetermining the mapping relationship between the environmental illuminance and the color temperature based on the human eye comfort index in such embodiments may include operation S1010 to operation S1070.

In operation S1010, a plurality of environmental illuminances are provided.

For example, when providing the environmental illuminance, it is possible to start a change range from 20 lux, and traverse in stride of 20 to 800 lux, then traverse in stride of 300 from 800 lux to 10^4 lux, where 10 lux corresponds to a dim brightness of a bedside lamp before bedtime, 800 lux corresponds to a standard indoor LED, and 10^4 lux corresponds to the brightness of sunlight. Table 2 shows an illuminance reference table for some different environments, but the present disclosure is not limited to the ranges and environments shown in Table 2.

TABLE 2

| Place/Environment | Illuminance |
|---|---|
| Sunny day | 30000-300000 lux |
| Indoor on sunny days | 100-1000 lux |
| Cloudy day | 3000-10000 lux |
| Office | 30-50 lux |
| . . . | |

In operation S1020, a plurality of images to be observed and a plurality of observers are determined.

In some embodiments, the plurality of images to be observed include natural scenery images, people images, and solid-color images. After a total number of the images to be observed is determined, the number of different types of images may be random or determined in proportion, such as 2:2:1.

Figure 11:
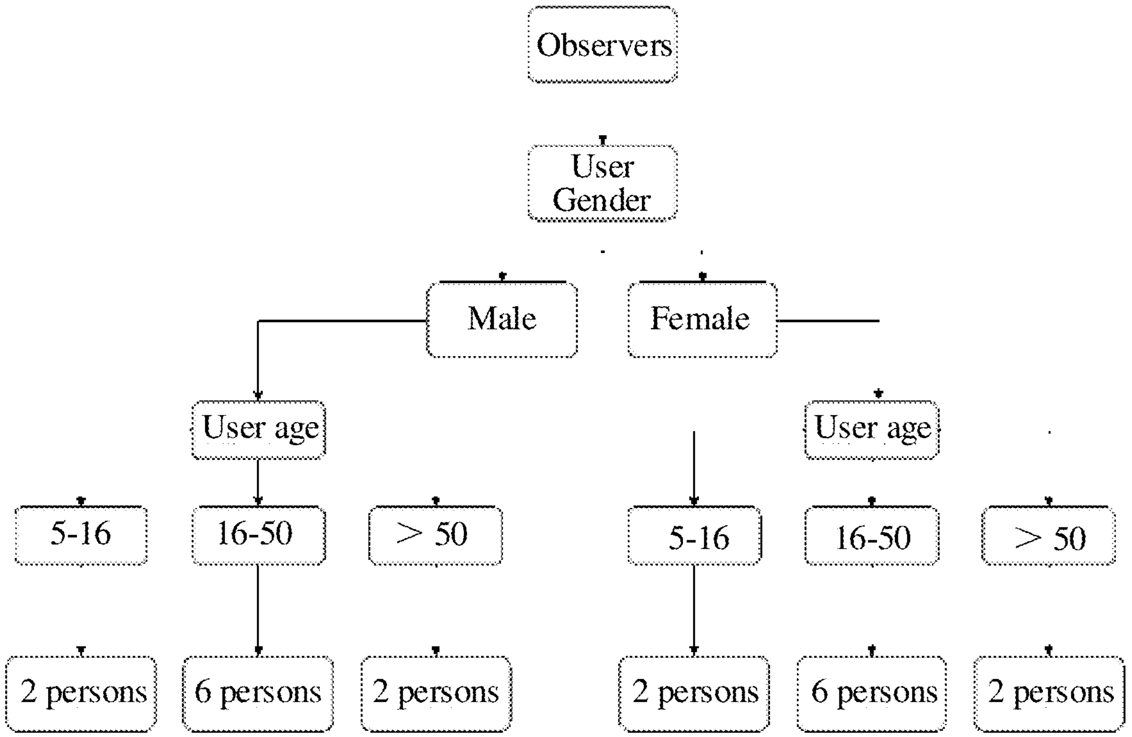
FIG. 11 shows a schematic diagram of a plurality of observers determined according to some exemplary embodiments of the present disclosure.

FIG. 11 shows a schematic diagram of a plurality of observers determined according to some exemplary embodiments of the present disclosure. When selecting observers, taking into account the differences in human eye characteristics, the requirements for selecting experimental observers are shown in FIG. 11 below. In particular, the age ranges and the number and proportion of persons in various age ranges shown in FIG. 11 are just examples, and the present disclosure is not limited to this.

In operation S1030, for each provided environmental illuminance, a color temperature range corresponding to the human eye comfort zone is determined according to the Kruithof curve, and the determined color temperature range is traversed in a predetermined stride to determine a plurality of color temperatures to be observed.

Figure 12:
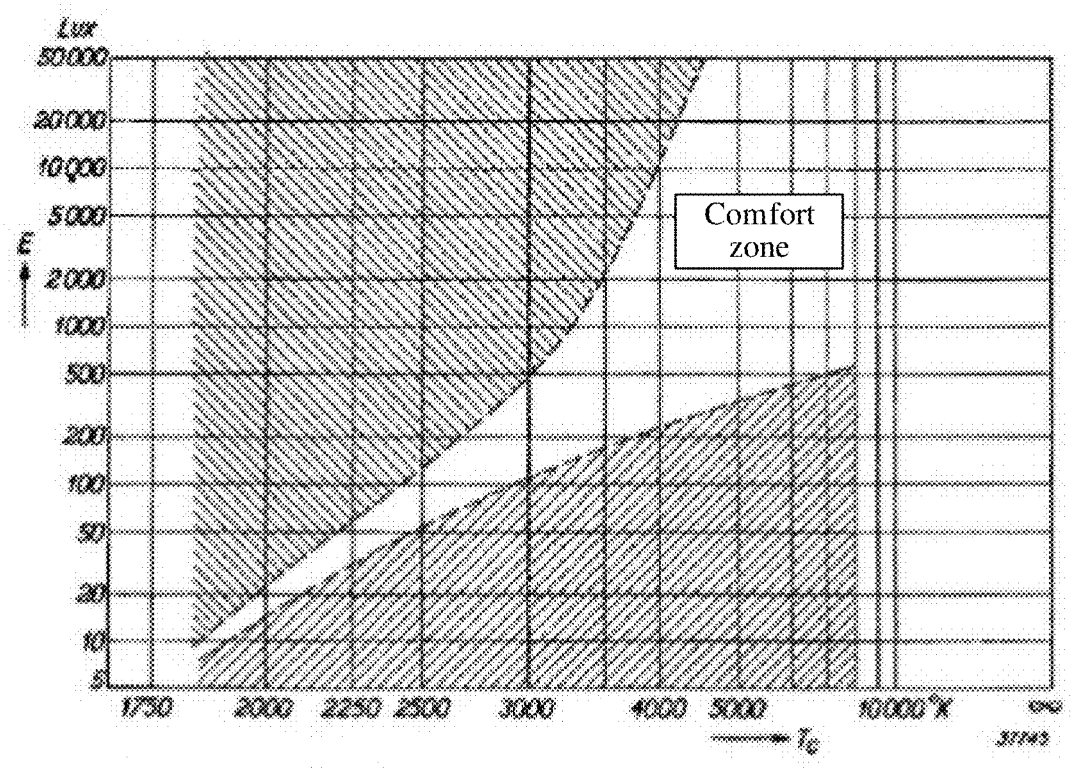
FIG. 12 shows a comfort zone diagram of a Kruithof curve according to some exemplary embodiments of the present disclosure.
Figure 13:
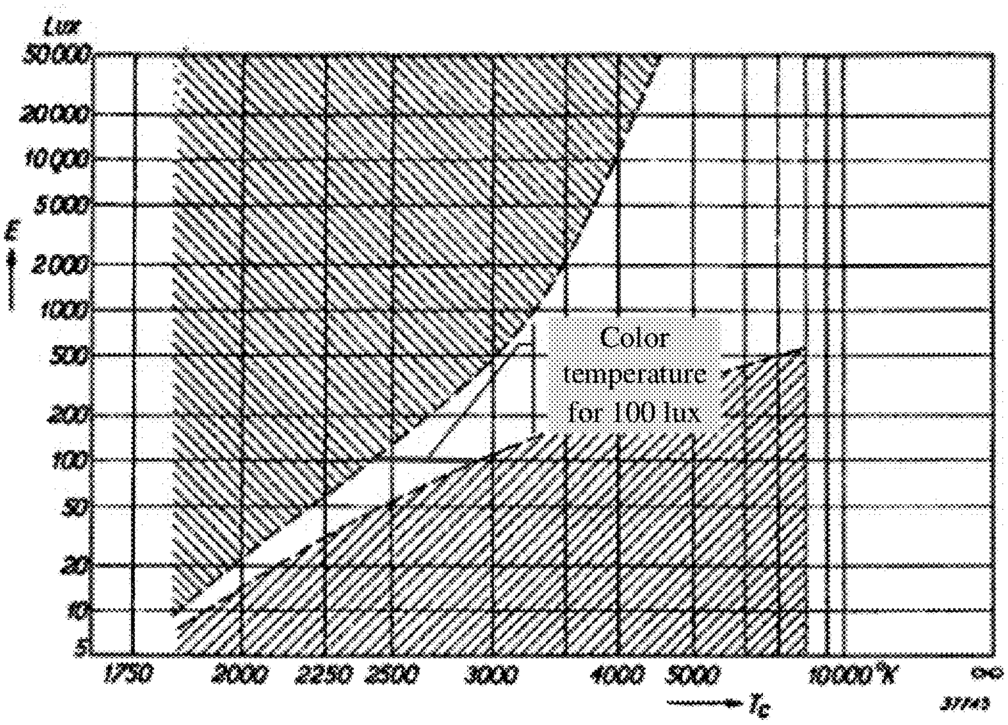
FIG. 13 shows a schematic diagram of a color temperature range determined according to some exemplary embodiments of the present disclosure.

FIG. 12 shows a comfort zone diagram of the Kruithof curve according to some exemplary embodiments of the present disclosure. FIG. 13 shows a schematic diagram of a color temperature range determined according to some exemplary embodiments of the present disclosure.

As shown in FIG. 12, a shaded zone is considered as an uncomfortable zone, and a white zone is considered as a human eye comfort zone. It is possible to draw a line on the Kruithof curve shown in FIG. 12 to determine the color temperature range corresponding to the human eye comfort zone under various environmental illuminances, and traverse the color temperature range in a predetermined stride to determine one or more color temperatures to be observed in the color temperature range. As shown in FIG. 13, the color temperature range indicated by the line segment corresponds to illumination of 100 lux.

In operation S1040, the display device is controlled to display the plurality of images to be observed at a plurality of color temperatures to be observed.

Figure 14:
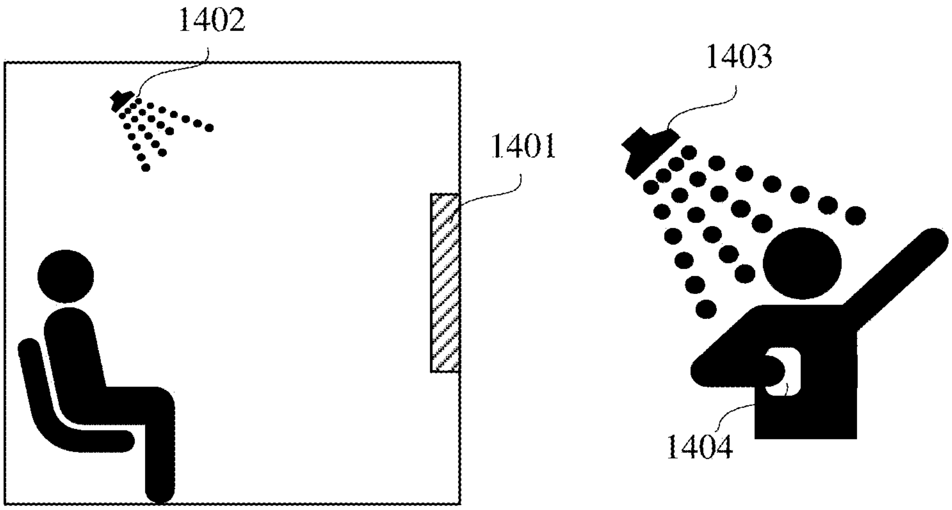
FIG. 14 shows an observation scene diagram according to some exemplary embodiments of the present disclosure.

FIG. 14 shows an observation scene diagram according to some exemplary embodiments of the present disclosure. As shown in a of FIG. 14, a plurality of images to be observed on a first screen 1401 may be viewed by an observer A in a sitting (or standing) posture at a plurality of color temperatures to be observed under the illumination of a first light source 1402. As shown in b of FIG. 14, a plurality of images to be observed displayed on a second screen 1404 may be viewed by an observer B in a hand-holding posture at a plurality of color temperatures to be observed under the illumination of a second light source 1403. The posture, angle and distance of the observer are not limited in the present disclosure.

In operation S1050, multi-dimensional scores of the displayed images to be observed are obtained from the plurality of observers.

TABLE 3

| | Evaluation Dimension | | | | |
|---|---|---|---|---|---|
| | Level 1 | Level 2 | Level 3 | Level 4 | Level 5 |
| Comfort | very uncomfortable | a bit uncomfortable | no feeling | comfortable | very comfortable |
| Brightness | very dark | a bit dark | normal | bright | very bright |
| Nervousness | very nervous | a bit nervous | normal | a bit relaxed | very relaxed |

Referring to Table 3, various evaluation dimensions and corresponding levels of each evaluation dimension are shown, in which each level may be assigned a corresponding score. For example, from level 1 to level 5, the assigned score starts from 20 points and increases in stride of 20.

In operation S1060, a comprehensive score is determined according to the multi-dimensional scores.

In some embodiments, the multi-dimensional scores include a score in a first dimension, a score in a second dimension, and a score in a third dimension. The first dimension represents the comfort of the observer when observing the displayed image, the second dimension represents the brightness of the displayed image that the observer feels when observing the displayed image, and the third dimension represents the nervousness of the observer when observing the displayed image. Determining the comprehensive score according to the multi-dimensional scores may include: calculating a weighted sum of the score in the first dimension, the score in the second dimension and the score in the third dimension to determine the comprehensive score.

TABLE 4

| Evaluation Dimension | Observer 1 | Observer 2 | Observer 3 | | Observer 20 | Average Score | Weighted average score |
|---|---|---|---|---|---|---|---|
| Comfort (0.5) | Level 5 | Level 4 | Level 3 | . . . | Level 3 | . . . | . . . |
| Brightness (0.25) | Level 3 | Level 4 | Level 3 | . . . | Level 3 | . . . | . . . |
| Nervousness | Level 5 | Level 5 | Level 3 | . . . | Level 5 | . . . | . . . |

TABLE 4-continued

| Evaluation Dimension | Observer 1 | Observer 2 | Observer 3 | . . . | Observer 20 | Average Score | Weighted average score |
|---|---|---|---|---|---|---|---|
| (0.25) | | | | | | | |
| Total | . . . | . . . | . . . | . . . | . . . | . . . | . . . |

Referring to Table 4, a scoring table from the plurality of observers is shown. For a color temperature to be observed, it is possible to obtain scores in Table 4 for each image to be observed that is played under each illuminance. For example, the score in the first dimension is the average score of comfort with a weight of 0.5, the score in the second dimension is the average score of brightness with a weight of 0.25, and the score in the third dimension is the average score of nervousness with a weight of 0.25. It is possible to multiply each weight by the corresponding dimensional score and calculate a sum to obtain the comprehensive score. A final comprehensive score at that color temperature is then obtained according to the comprehensive scores of all the images to be observed (e.g., by direct summing, or weighted summing).

In operation S1070, the color temperature to be observed having a highest comprehensive score is determined as a color temperature corresponding to the environmental illuminance.

Figure 15:
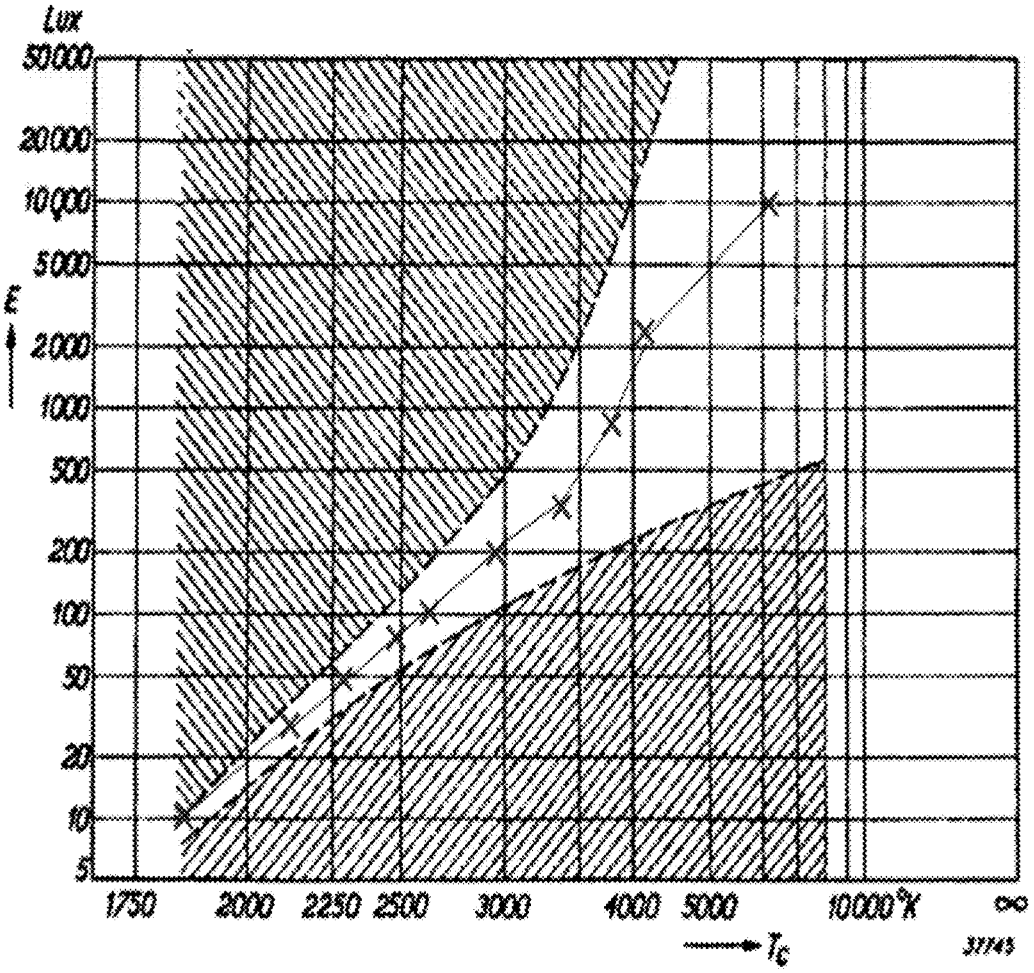
FIG. 15 shows a schematic diagram of a human eye comfort curve according to some exemplary embodiments of the present disclosure.

FIG. 15 shows a schematic diagram of a human eye comfort curve according to some exemplary embodiments of the present disclosure. Referring to FIG. 15, the corresponding color temperatures are determined for some environmental illuminances, so as to obtain an eye comfort curve, and a LUT table between the color temperature of screen display and the environmental illuminance may be generated according to the human eye comfort curve. In some embodiments, it is possible to obtain the environmental illuminance of the environment using a sensor on the display screen when determining the target color temperature in operation S410, and then determine the corresponding color temperature as the target color temperature based on the human eye comfort curve shown in FIG. 15 or the generated LUT table between the screen display color temperature and the environmental illuminance. The environmental illuminance of the environment may be acquired in real time, such as every 1 second, or the environmental illuminance may be automatically sensed and determined in response to changes in the environment.

According to embodiments of the present disclosure, not only the parameter of the display device but also the environmental illuminance and the human eye comfort are taken into account, and the eye protection mode with intelligent adjustment of color temperature may be achieved for different display devices, so as to provide a better human eye comfort experience.

Figure 16:
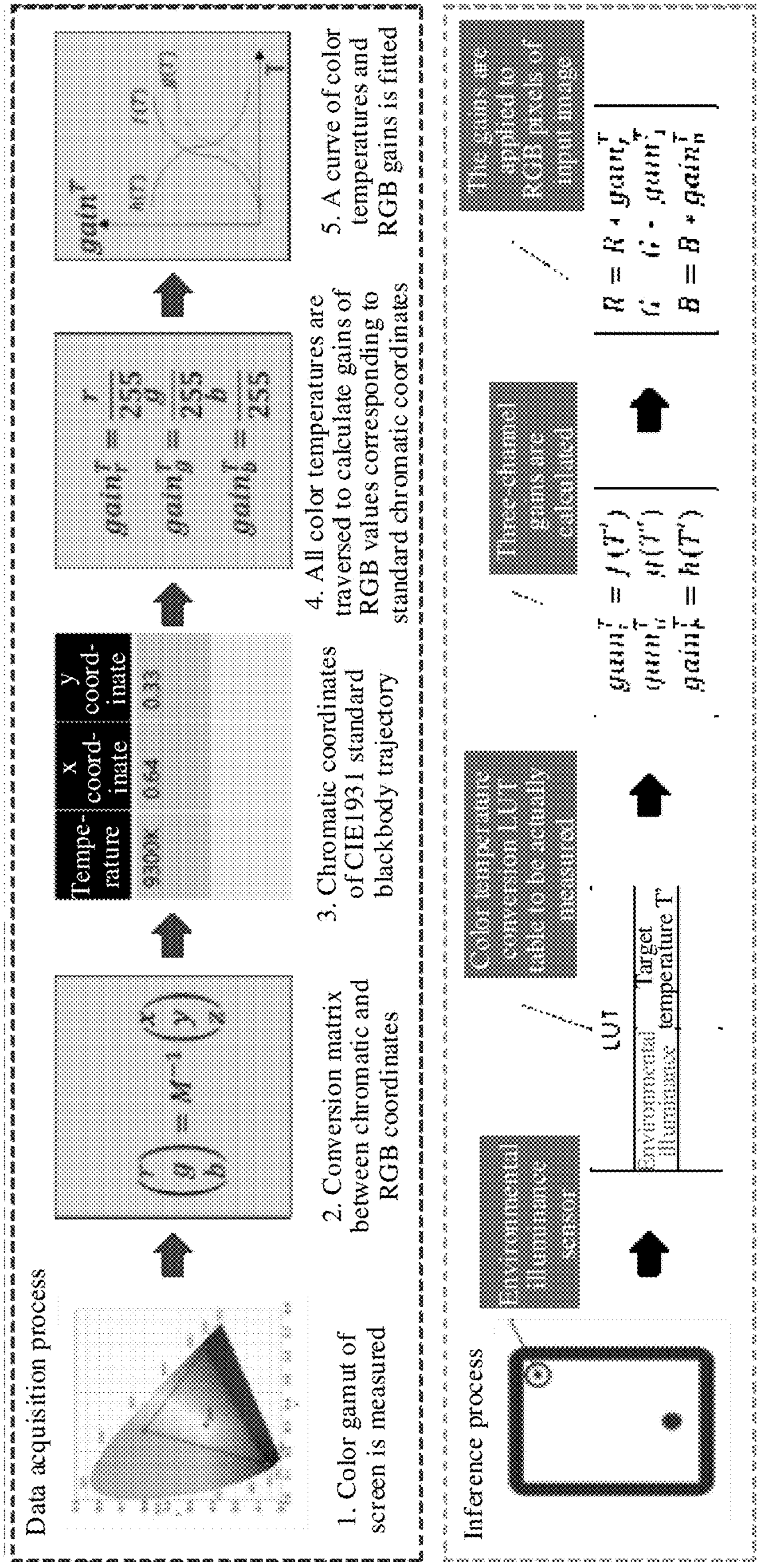
FIG. 16 shows a flowchart of a display method applied to a display device according to other exemplary embodiments of the present disclosure.
Figure 17:
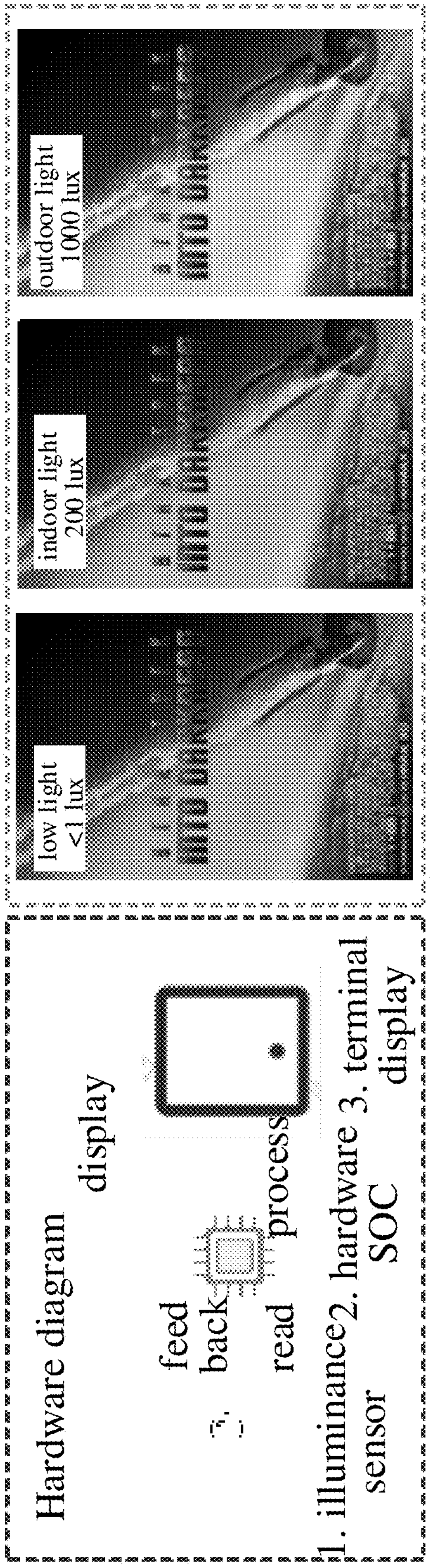
FIG. 17 shows a schematic diagram of a display effect according to other exemplary embodiments of the present disclosure.

FIG. 16 shows a flowchart of a display method applied to a display device according to other exemplary embodiments of the present disclosure. FIG. 17 shows a schematic diagram of a display effect according to other exemplary embodiments of the present disclosure.

As shown in FIG. 16, the display method in such embodiments includes a data acquisition process and an inference process. In the data acquisition process, the color gamut of the display screen is measured firstly; then the conversion matrix between the chromatic coordinates and the RGB coordinates is obtained; the chromatic coordinates of the CIE1931 standard blackbody trajectory are obtained; all color temperatures are traversed, and the gains of the RGB values corresponding to the standard chromatic coordinates are calculated, which may also be converted to the gains of the rgb values; and finally a curve of the color temperature and RGB gain is fitted to obtain the functional relationship. In addition, it is possible to determine the human eye comfort curve as shown in FIG. 15. In the inference process, the environmental illuminance is obtained firstly by using a sensor; a target color temperature T' is determined according to the color temperature conversion LUT table generated in FIG. 15; then three-channel gains are determined according to the functional relationship; and finally the gains are applied to the RGB pixels of the input image.

As shown in FIG. 17, the functional relationship between the gains of the plurality of primary color components of the display device and the color temperature may be written into hardware SOC (System-on-Chip). In the inference process as shown in FIG. 16, an illuminance sensor may acquire the environmental illuminance and feed it back to the hardware SOC, that is, the hardware SOC may read the environmental illuminance fed back by the illuminance sensor. The hardware SOC may acquire an image to be displayed, determine the three-channel gains, and then apply the gains to the RGB values of each pixel in the image so as to adjust the color temperature of the screen display. For example, it is possible to acquire the illuminance information cyclically every 1 second, and continuously process and display the image. The display effects in low light (<1 lux), indoor light (200 lux) and outdoor light (1000 lux) are shown in FIG. 17.

In some embodiments, the present disclosure further provides a display device. The display device will be described in detail below with reference to FIG. 18.

Figure 18:
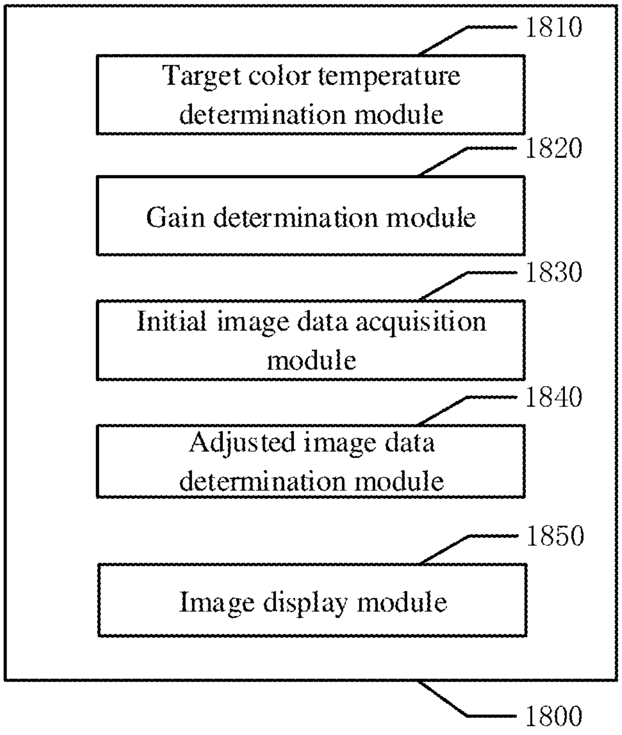
FIG. 18 schematically shows a structural block diagram of a display device according to embodiments of the present disclosure.

FIG. 18 schematically shows a block diagram of a display device according to embodiments of the present disclosure.

As shown in FIG. 18, a display device 1800 in such embodiments includes a target color temperature determination module 1810, a gain determination module 1820, an initial image data acquisition module 1830, an adjusted image data determination module 1840, and an image display module 1850. The display device 1800 may display according to image data of an image to be displayed, and the image data includes grayscales corresponding to a plurality of primary color components in a color gamut of a display screen of the display device.

The target color temperature determination module 1810 may perform operation S410 to determine a target color temperature.

In some embodiments, the target color temperature determination module 1810 may perform operation S910 to operation S920, which will not be repeated here.

The gain determination module 1820 may perform operation S420 to: determine gains of the plurality of primary color components of the display device according to a functional relationship between the gains of the plurality of primary color components of the display device and the color temperature, where the gains of the plurality of primary color components of the display device correspond to the target color temperature, and the functional relationship between the gains of the plurality of primary color components of the display device and the color temperature is predetermined according to a parameter of the display device.

In some embodiments, the plurality of primary color components include a red component, a green component, and a blue component. The functional relationship between the gains of the plurality of primary color components of the display device and the color temperature includes: a first functional relationship between a gain of the red component and the color temperature, a second functional relationship between a gain of the green component and the color temperature, and a third functional relationship between the gain of the blue component and the color temperature.

In some embodiments, the gain determination module 1820 may perform operations S710 to operation S720 and operation S810 to operation S830, which will not be repeated here.

The initial image data acquisition module 1830 may perform operation S430 to acquire the initial image data of the image to be displayed, where the initial image data includes initial grayscales corresponding to the plurality of primary color components.

The adjusted image data determination module 1840 may perform operation S440 to: determine adjusted image data of the image to be displayed based on the determined gains of the plurality of primary color components of the display device and the acquired initial image data of the image to be displayed. The adjusted image data of the image to be displayed includes adjusted grayscales corresponding to the plurality of primary color components.

The image display module 1850 may perform operation S450 to display the image to be displayed based on the adjusted image data of the image to be displayed.

In some embodiments, the display device 1800 may further include a functional relationship determination module, which may be used to perform operation S510 to operation S530 and operation S610 to operation S640, and details will not be repeated here.

In some embodiments, the functional relationship determination module of the display device 1800 may be used to measure a chromatic coordinate of the display screen displaying a pure red image, a chromatic coordinate of the display screen displaying a pure green image, a chromatic coordinate of the display screen displaying a pure blue image, and a chromatic coordinate of the display screen displaying a pure white image; and determine the color gamut of the display screen according to the chromatic coordinate of the display screen displaying the pure red image, the chromatic coordinate of the display screen displaying the pure green image, the chromatic coordinate of the display screen displaying the pure blue image, and the chromatic coordinate of the display screen displaying the pure white image.

In some embodiments, the functional relationship between the gains of the plurality of primary color components of the display device and the color temperature is a cubic power functional relationship.

In some embodiments, the display device 1800 may further include a mapping relationship determination module, which may be used to perform operation S1010 to operation S1070 and operation S610 to operation S640, and details will not be repeated here.

In some embodiments, the multi-dimensional scores include a score in a first dimension, a score in a second dimension and a score in a third dimension. A first dimension represents a comfort of an observer when observing the displayed image, a second dimension represents a brightness of the displayed image that the observer feels when observing the displayed image, and a third dimension represents a nervousness of the observer when observing the displayed image. Determining the comprehensive score according to the multi-dimensional scores may include: calculating a weighted sum of the score in the first dimension, the score in the second dimension and the score in the third dimension to determine the comprehensive score.

It should be noted that the implementations, the solved technical problems, the achieved functions and the produced technical effects of the modules/units/sub-units, etc. in embodiments of the device are the same or similar to those of the corresponding steps in embodiments of the method, which will not be repeated here.

According to embodiments of the present disclosure, any two or more of the target color temperature determination module 1810, the gain determination module 1820, the initial image data acquisition module 1830, the adjusted image data determination module 1840 and the image display module 1850 may be combined as one module, or any one of them may be divided into a plurality of modules. Alternatively, at least part of the functions of one or more of these modules may be combined with at least part of the functions of other modules, and implemented in one module.

According to embodiments of the present disclosure, at least one of the target color temperature determination module 1810, the gain determination module 1820, the initial image data acquisition module 1830, the adjusted image data determination module 1840 and the image display module 1850 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the target color temperature determination module 1810, the gain determination module 1820, the initial image data acquisition module 1830, the adjusted image data determination module 1840 and the image display module 1850 may be at least partially implemented as a computer program module that may perform corresponding functions when executed.

In some embodiments, the present disclosure further provides an electronic apparatus, which will be described in detail below with reference to FIG. 19.

Figure 19:
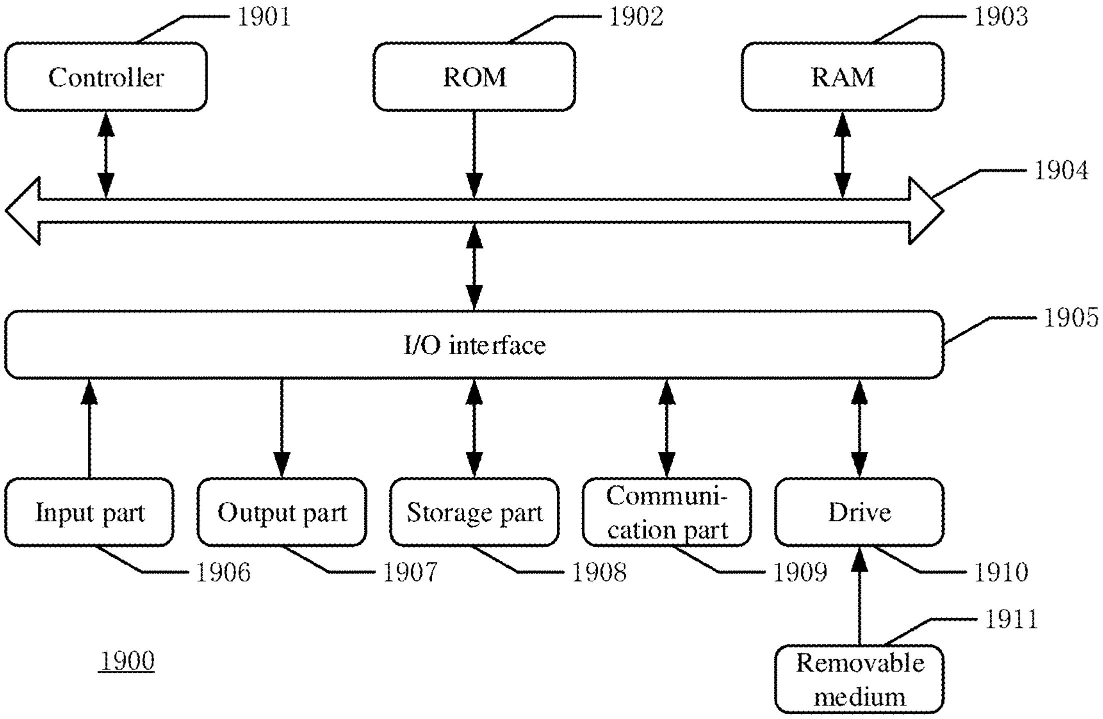
FIG. 19 schematically shows a block diagram of an electronic apparatus suitable for implementing a display method according to embodiments of the present disclosure.

FIG. 19 schematically shows a block diagram of an electronic apparatus suitable for implementing a display method according to embodiments of the present disclosure.

In some embodiments, the electronic apparatus 1900 includes a display screen and a controller 1901. The controller 1901 is configured to control, using the display method described in any one of the embodiments described in FIG. 4 to FIG. 17, the display screen to display an image to be displayed.

In some embodiments, the electronic apparatus 1900 further includes a sensor, which is used to acquire an environmental illuminance of an environment where the display screen is located. The sensor is communicatively connected with the controller.

Further, as shown in FIG. 19, the controller 1901 of embodiments of the present disclosure may execute various appropriate actions and processing according to the program stored in a read only memory (ROM) 1902 or the program loaded into a random access memory (RAM) 1903 from a storage part 1908. The processor 1901 may, for example, include a general-purpose microcontroller (for example, CPU), an instruction set controller and/or a related chipset and/or a special-purpose microcontroller (for example, an application specific integrated circuit (ASIC)), and the like. The controller 1901 may further include an on-board memory for caching purposes. The controller 1901 may include a single processing unit or multiple processing units for executing different actions of the method flow according to embodiments of the present disclosure.

Various programs and data required for the operation of the electronic apparatus 1900 are stored in the RAM 1903. The controller 1901, the ROM 1902 and the RAM 1903 are connected to each other through a bus 1904. The controller 1901 executes various operations of the method flow according to embodiments of the present disclosure by executing the programs in the ROM 1902 and/or the RAM 1903. It should be noted that the program may also be stored in one or more memories other than the ROM 1902 and the RAM 1903. The controller 1901 may also execute various operations of the method flow according to embodiments of the present disclosure by executing the programs stored in the one or more memories.

According to embodiments of the present disclosure, the electronic apparatus 1900 may further include an input/output (I/O) interface 1905 which is also connected to the bus 1904. The electronic apparatus 1900 may further include one or more of the following components connected to the I/O interface 1905: an input part 1906 including a keyboard, a mouse, etc.: an output part 1907 including a cathode ray tube (CRT), a liquid crystal display (LCD), etc. and a speaker, etc.: a storage part 808 including a hard disk, etc.; and a communication part 1909 including a network interface card such as a LAN card, a modem, and the like. The communication part 1909 performs communication processing via a network such as the Internet. A drive 1910 is also connected to the I/O interface 1905 as required. A removable medium 1911, such as a magnetic disk, an optical disk, a magneto-optical disk, a semiconductor memory, and the like, is installed on the drive 1910 as required, so that the computer program read therefrom is installed into the storage part 1908 as needed.

The present disclosure further provides a computer-readable storage medium, which may be included in the apparatus/device/system described in the above embodiments: or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 1902 and/or RAM 1903 and/or one or more memories other than the ROM 1902 and RAM 1903.

Embodiments of the present disclosure further include a computer program product, which contains a computer program. The computer program contains program code for performing the method shown in the flowchart. When the computer program product runs on a computer system, the program code causes the computer system to implement the method provided in embodiments of the present disclosure.

When the computer program is executed by the controller 1901, the above-mentioned functions defined in the system/apparatus of the embodiments of the present disclosure are performed. According to the embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 1909, and/or installed from the removable medium 1911. The program code contained in the computer program may be transmitted by any suitable medium, including but not limited to a wireless one, a wired one, or any suitable combination of the above.

In such embodiments, the computer program may be downloaded and installed from the network through the communication part 1909, and/or installed from the removable medium 1911. When the computer program is executed by the controller 1901, the above-mentioned functions defined in the system of embodiments of the present disclosure are executed. According to embodiments of the present disclosure, the systems, apparatuses, devices, modules, units, etc. described above may be implemented through a computer program module.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Here, the terms "substantially", "about", "approximately" and other similar terms are used as terms of approximation rather than terms of degree, and they are intended to explain an inherent deviation of a measured or calculated value that will be recognized by those ordinary skilled in the art. Taking into account a process fluctuation, a measurement problem, an error related to a measurement of a specific quantity (that is, a limitation of a measurement system) and other factors, the terms "about" or "approximately" used herein includes a stated value and means that a specific value determined by those ordinary skilled in the art is within an acceptable range of deviation. For example, "about" may mean being within one or more standard deviations, or within ±10% or ±5% of the stated value.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A display method applied to a display device, wherein the display device is configured to display according to adjusted image data of an image to be displayed, and the adjusted image data comprises grayscales corresponding to a plurality of primary color components in a color gamut of a display screen of the display device, wherein the method comprises:

determining a target color temperature;

determining gains of the plurality of primary color components of the display device by using the target color temperature according to a functional relationship between the gains of the plurality of primary color components of the display device and a color temperature, wherein the gains of the plurality of primary color components of the display device correspond to the target color temperature, and the functional relationship between the gains of the plurality of primary color components of the display device and the color temperature is predetermined according to a parameter of the display device;

acquiring initial image data of the image to be displayed, wherein the initial image data comprises initial grayscales corresponding to the plurality of primary color components;

determining the adjusted image data of the image to be displayed based on the determined gains of the plurality of primary color components of the display device and the acquired initial image data of the image to be displayed, wherein the adjusted image data of the image to be displayed comprises adjusted grayscales corresponding to the plurality of primary color components; and displaying the image to be displayed based on the adjusted image data of the image to be displayed;

wherein the determining a target color temperature comprises:

acquiring an environmental illuminance of an environment in which the display screen is located;

determining the target color temperature corresponding to the environmental illuminance according to a mapping relationship between the environmental illuminance and the color temperature, wherein the mapping relationship between the environmental illuminance and the color temperature is predetermined based on a human eye comfort index.

2. The display method according to claim 1, wherein predetermining the functional relationship between the gains of the plurality of primary color components of the display device and the color temperature according to the parameter of the display device comprises:

determining the color gamut of the display screen of the display device;

determining a conversion matrix according to the determined color gamut of the display screen, wherein the conversion matrix is configured to perform a color conversion between a color space of the display screen and a standard color space; and determining the functional relationship between the gains of the plurality of primary color components of the display device and the color temperature according to the conversion matrix.

3. The display method according to claim 2, wherein the determining the functional relationship between the gains of the plurality of primary color components of the display device and the color temperature according to the conversion matrix comprises:

acquiring a mapping table between the color temperature and chromatic coordinates in the standard color space;

determining chromatic coordinates of a white dot in the color space of the display screen at a plurality of color temperatures according to the mapping table between the color temperature and the chromatic coordinates in the standard color space and the conversion matrix;

determining the gains of the plurality of primary color components at the plurality of color temperatures according to the chromatic coordinates of the white dot in the color space of the display screen at the plurality of color temperatures and a predetermined parameter; and fitting the functional relationship between the gains of the plurality of primary color components of the display device and the color temperature according to the gains of the plurality of primary color components at the plurality of color temperatures.

4. The display method according to claim 3, wherein the functional relationship between the gains of the plurality of primary color components of the display device and the color temperature is a cubic power functional relationship.

5. The display method according to claim 3, wherein the predetermined parameter is 255.

6. The display method according to claim 2, wherein the determining the color gamut of the display screen of the display device comprises:

measuring the chromatic coordinates of the display screen displaying a pure red image, the chromatic coordinates of the display screen displaying a pure green image, the chromatic coordinates of the display screen displaying a pure blue image, and the chromatic coordinates of the display screen displaying a pure white image, respectively; and determining the color gamut of the display screen according to the chromatic coordinates of the display screen displaying the pure red image, the chromatic coordinates of the display screen displaying the pure green image, the chromatic coordinates of the display screen displaying the pure blue image, and the chromatic coordinates of the display screen displaying the pure white image.

7. The display method according to claim 1, wherein predetermining the mapping relationship between the environmental illuminance and the color temperature based on the human eye comfort index comprises:

providing a plurality of environmental illuminances;

determining a plurality of images to be observed and a plurality of observers;

for each provided environmental illuminance, determining a color temperature range for a human eye comfort zone according to a Kruithof curve; traversing the determined color temperature range in a predetermined stride to determine a plurality of color temperatures to be observed; controlling the display device to display the plurality of images to be observed at the plurality of color temperatures to be observed; obtaining multi-dimensional scores of the plurality of images to be observed from the plurality of observers respectively; determining a comprehensive score according to the multi-dimensional scores; and determining a color temperature to be observed having a highest comprehensive score as the color temperature corresponding to the environmental illuminance.

8. The display method according to claim 7, wherein the multi-dimensional scores comprise a score in a first dimension, a score in a second dimension and a score in a third dimension, the first dimension represents a comfort of an observer observing a displayed image, the second dimension represents a brightness of the displayed image perceived by the observer observing the displayed image, and the third dimension represents a nervousness of the observer observing the displayed image; and the determining a comprehensive score according to the multi-dimensional scores comprises: calculating a weighted sum of the score in the first dimension, the score in the second dimension and the score in the third dimension to determine the comprehensive score.

9. The display method according to claim 7, wherein the plurality of images to be observed comprise a natural scenery image, a people image, and a solid color image.

10. The display method according to claim 1, wherein the plurality of primary color components comprise a red component, a green component, and a blue component; and the functional relationship between the gains of the plurality of primary color components of the display device and the color temperature comprises: a first functional relationship between the gain of the red component and the color temperature, a second functional relationship between the gain of the green component and the color temperature, and a third functional relationship between the gain of the blue component and the color temperature.

11. The display method according to claim 10, wherein the determining gains of a plurality of primary color components of the display device according to a functional relationship between the gains of the plurality of primary color components of the display device and a color temperature comprises:

determining a first gain of the red component of the display device according to the first functional relationship between the gain of the red component of the display device and the color temperature;

determining a second gain of the green component of the display device according to the second functional relationship between the gain of the green component of the display device and the color temperature; and determining a third gain of the blue component of the display device according to the third functional relationship between the gain of the blue component of the display device and the color temperature.

12. The display method according to claim 11, wherein the initial image data comprises a first initial grayscale corresponding to the red component, a second initial grayscale corresponding to the green component, and a third initial grayscale corresponding to the blue component; and wherein the determining adjusted image data of the image to be displayed based on the determined gains of the plurality of primary color components of the display device and the acquired initial image data of the image to be displayed comprises:

multiplying the first initial grayscale by the first gain to obtain a first adjusted grayscale of the adjusted image data;

multiplying the second initial grayscale by the second gain to obtain a second adjusted grayscale of the adjusted image data; and multiplying the third initial grayscale by the third gain to obtain a third adjusted grayscale of the adjusted image data.

13. An electronic apparatus, comprising:

a display screen; and a controller configured to control, using the display method according to claim 1, the display screen to display an image to be displayed.

14. The electronic apparatus according to claim 13, wherein the electronic apparatus further comprises a sensor configured to acquire an environmental illuminance of an environment in which the display screen is located, and the sensor is communicatively connected with the controller.

* * * * *